(12) United States Patent
Noguchi et al.

(10) Patent No.: US 9,154,060 B2
(45) Date of Patent: Oct. 6, 2015

(54) VEHICLE DRIVING DEVICE

(75) Inventors: Masatoshi Noguchi, Wako (JP); Satoshi Ando, Wako (JP); Masayuki Kikuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/129,498

(22) PCT Filed: Jul. 4, 2012

(86) PCT No.: PCT/JP2012/067131
§ 371 (c)(1),
(2), (4) Date: Dec. 26, 2013

(87) PCT Pub. No.: WO2013/005783
PCT Pub. Date: Jan. 10, 2013

(65) Prior Publication Data
US 2014/0191689 A1  Jul. 10, 2014

(30) Foreign Application Priority Data
Jul. 4, 2011  (JP) .................. 2011-148489

(51) Int. Cl.
*H02P 5/68* (2006.01)
*B60K 6/52* (2007.10)
(Continued)

(52) U.S. Cl.
CPC . *H02P 5/68* (2013.01); *B60K 6/448* (2013.01); *B60K 6/52* (2013.01); *B60K 7/0007* (2013.01);
(Continued)

(58) Field of Classification Search
CPC ........................................................ H02P 5/68
USPC ................................................ 318/3, 34, 255
See application file for complete search history.

(56) References Cited

U.S. PATENT DOCUMENTS 5,453,930 A * 9/1995 Imaseki et al. .................. 701/22
7,154,244 B2 * 12/2006 Asaumi et al. ................ 318/599
(Continued)

FOREIGN PATENT DOCUMENTS

CN  1819933 A  8/2006
EP  0775607 A1  5/1997
(Continued)

OTHER PUBLICATIONS

Japanese Office Action dated Sep. 24, 2014, issued in corresponding JP application No. 2013-523041 (4 pages).
(Continued)

*Primary Examiner* — David S Luo
(74) *Attorney, Agent, or Firm* — Westerman, Hattori, Daniels & Adrian, LLP

(57) ABSTRACT

A rear wheel driving device includes left and right electric motors connected to left and right rear wheel, respectively; and a control device for controlling the electric motors such that a third relationship is satisfied as the first priority based on at least either a first relationship or a second relationship, and the third relationship. The first relationship includes sum of right and left wheel torques, sum of right and left motor torques, sum of right and left wheel driving forces, or sum of right and left motor driving forces. The second relationship includes difference between right and left wheel torques, difference between right and left motor torques, difference between right and left wheel driving forces, or difference between right and left motor driving forces. The third relationship includes sum of left and right electric powers generated or consumed by the electric motors, respectively.

22 Claims, 19 Drawing Sheets

(51) Int. Cl.
*B60K 7/00* (2006.01)
*B60K 6/448* (2007.10)
*B60L 11/12* (2006.01)
*B60L 11/14* (2006.01)
*B60L 15/20* (2006.01)
*B60W 30/184* (2012.01)
*B60K 17/04* (2006.01)
*B60W 10/08* (2006.01)
*B60W 30/045* (2012.01)
*B60W 20/00* (2006.01)
*B60W 50/00* (2006.01)

(52) U.S. Cl.
CPC ............... *B60L 11/12* (2013.01); *B60L 11/14* (2013.01); *B60L 15/2036* (2013.01); *B60W 30/1843* (2013.01); *B60K 17/046* (2013.01); *B60K 2007/0092* (2013.01); *B60L 2220/46* (2013.01); *B60W 10/08* (2013.01); *B60W 20/50* (2013.01); *B60W 30/045* (2013.01); *B60W 2050/0091* (2013.01); *B60W 2520/30* (2013.01); *B60W 2720/406* (2013.01); *Y02T 10/6243* (2013.01); *Y02T 10/6265* (2013.01); *Y02T 10/648* (2013.01); *Y02T 10/7005* (2013.01); *Y02T 10/7077* (2013.01); *Y02T 10/7275* (2013.01)

(56) References Cited

U.S. PATENT DOCUMENTS 8,177,007 B2 * 5/2012 Abe et al. ............... 180/65.285
2010/0004090 A1 1/2010 Mizutani et al.

FOREIGN PATENT DOCUMENTS

| | | |
|---|---|---|
| EP | 2008900 A1 | 12/2008 |
| EP | 2055597 A2 | 5/2009 |
| EP | 2416033 A1 | 2/2012 |
| EP | 2461070 A1 | 6/2012 |
| JP | 11-301293 A | 11/1999 |
| JP | 2004-112851 A | 4/2004 |
| JP | 2006-166508 A | 6/2006 |
| JP | 2007-168503 A | 7/2007 |
| JP | 2007-210586 A | 8/2007 |
| JP | 2009-033888 A | 2/2009 |
| JP | 2009-177994 A | 8/2009 |
| JP | 2010-236674 A | 10/2010 |
| WO | 2011/013829 A1 | 2/2011 |

OTHER PUBLICATIONS

International Search Report dated Sep. 18, 2012 issued in corresponding application No. PCT/JP2012/067131.
Extended European Search Report dated Apr. 10, 2015, issued in corresponding EP Patent Application No. 12808183.3 (8 pages).
Office Action dated Apr. 27, 2015, issued in corresponding Chinese application No. 201280030606.9, (with English translation), (12 pages).

* cited by examiner

FIG. 11

| VEHICLE CONDITION | FRONT UNIT | REAR UNIT | REAR MOTOR | EOP | SOL | OWC | BRK |
|---|---|---|---|---|---|---|---|
| STOP | × | × | STOP | OFF | OFF | OFF | OFF |
| FORWARD MOVEMENT AT LOW SPEED | × | ○ | POWER DRIVING | Lo | OFF | ON | ON (SLIGHTLY ENGAGED) |
| FORWARD MOVEMENT AT INTERMEDIATE SPEED | ○ | × | STOP | Lo | OFF | OFF | ON (SLIGHTLY ENGAGED) |
| DECELERATION REGENERATION | ○ | ○ | REGENERATION DRIVING | Hi | OFF | OFF | ON |
| ACCELERATION | ○ | ○ | POWER DRIVING | Lo | OFF | ON | ON (SLIGHTLY ENGAGED) |
| FORWARD MOVEMENT AT HIGH SPEED | ○ | × | STOP | Lo | ON | OFF | OFF |
| BACKWARD MOVEMENT | × | ○ | REVERSE POWER DRIVING | Hi | OFF | OFF | ON |

VEHICLE DRIVING DEVICE

TECHNICAL FIELD

The present invention relates to a vehicle driving device provided with a left motor generator connected to a left wheel and a right motor generator connected to a right wheel.

BACKGROUND ART

Patent Document 1 discloses that, in a vehicle driving device provided with a left motor generator connected to a left wheel and a right motor generator connected to a right wheel, one of the motor generators is operated as an electric motor and the other motor generator is simultaneously operated as a generator in accordance with steering, thus enabling effective utilization of electric power and a reduction in battery capacity.

Patent Document 2 discloses that, in a vehicle driving device provided with a motor generator for driving right and left rear wheels independently, torques for the right and left rear wheels are outputted in order to satisfy driver's driving requirements and produce an optimal yawing moment for traveling of a vehicle under any battery charging conditions.

PRIOR ART REFERENCE

Patent Document

Patent Document 1: JP-A-2006-166508
Patent Document 2: JP-A-2007-210586

SUMMARY OF THE INVENTION

Problems to be Solved by the Invention

In some cases, a state of a component such as a battery installed on a vehicle needs to allow a balance of electric power to be achieved between right and left motor generators in accordance with temperature and/or in response to a failure. However, the vehicle driving device disclosed in Patent Document 1 is intended to provide most of electric power consumed by the motor generator operating as an electric motor by utilizing electric power generated by the motor generator operating as a generator, and is therefore not intended to perform control targeted for electric power on a priority basis. The vehicle driving device disclosed in Patent Document 2 is also not intended to perform control targeted for electric power on a priority basis.

The present invention has been made in view of the above-described problems, and its object is to provide a vehicle driving device capable of satisfying a requirement for electric power and capable of preventing an excess or deficiency of electric power and damage to an electrical system.

Solution to the Problems

To achieve the above object, the invention of Claim 1 provides a vehicle driving device (e.g., a rear wheel driving device 1 according to an after-mentioned embodiment) including:

a left motor generator (e.g., an electric motor 2A according to the after-mentioned embodiment) connected to a left wheel (e.g., a left rear wheel LWr according to the after-mentioned embodiment) of a vehicle;

a right motor generator (e.g., an electric motor 2B according to the after-mentioned embodiment) connected to a right wheel (e.g., a right rear wheel RWr according to the after-mentioned embodiment) of the vehicle; and a control device (e.g., a control device 8 according to the after-mentioned embodiment) for controlling the right and left motor generators, wherein the control device performs an electric power-prioritized control for controlling the right and left motor generators such that a third relationship is satisfied as the first priority based on at least either a first relationship or a second relationship and the third relationship, wherein the first relationship is defined as including a sum of right and left wheel torques, a sum of right and left motor generator torques, a sum of right and left wheel driving forces, or a sum of right and left motor generator driving forces, wherein the second relationship is defined as including a difference between right and left wheel torques, a difference between right and left motor generator torques, a difference between right and left wheel driving forces, or a difference between right and left motor generator driving forces, and wherein the third relationship is defined as including a sum of a left electric power which is generated or consumed by the left motor generator and a right electric power which is generated or consumed by the right motor generator.

The invention of Claim 2 based on Claim 1 provides the vehicle driving device, wherein the device includes a power source (e.g., a battery 9 and/or an electric motor 5 according to the after-mentioned embodiment) electrically connected to the right and left motor generators, and wherein the electric power-prioritized control is performed in accordance with a state of the power source.

The invention of Claim 3 based on Claim 2 provides the vehicle driving device, wherein the power source is a battery (e.g., the battery 9 according to the after-mentioned embodiment), and wherein the electric power-prioritized control is performed in accordance with a state of the battery.

The invention of Claim 4 based on Claim 3 provides the vehicle driving device, wherein when a storage state of the battery is equal to or lower than a given level, the electric power-prioritized control is performed such that the sum of the left electric power and the right electric power in the third relationship becomes zero or more, where generation of electric power is defined as a positive value.

The invention of Claim 5 based on Claim 3 provides the vehicle driving device, wherein when a storage state of the battery is equal to or higher than a given level, the electric power-prioritized control is performed such that the sum of the left electric power and the right electric power in the third relationship becomes zero or less, where generation of electric power is defined as a positive value.

The invention of Claim 6 based on Claim 3 provides the vehicle driving device, wherein the electric power-prioritized control is performed in accordance with allowable input and output of the battery such that the sum of the left electric power and the right electric power in the third relationship falls within a range of the allowable input and output.

The invention of Claim 7 based on Claim 3 provides the vehicle driving device, wherein when a temperature of the battery is equal to or lower than a given temperature, the electric power-prioritized control is performed such that the sum of the left electric power and the right electric power in the third relationship becomes zero.

The invention of Claim 8 based on Claim 3 provides the vehicle driving device, wherein when a failure in the battery is detected, the electric power-prioritized control is performed such that the sum of the left electric power and the right electric power in the third relationship becomes zero.

The invention of Claim 9 based on Claim 2 provides the vehicle driving device, wherein the power source is another motor generator (e.g., the electric motor 5 according to the after-mentioned embodiment) different from the right and left motor generators, and the electric power-prioritized control is performed in accordance with a state of the another motor generator.

The invention of Claim 10 based on Claim 9 provides the vehicle driving device, wherein when an electric power generation state of the another motor generator is equal to or lower than a given level, the electric power-prioritized control is performed such that the sum of the left electric power and the right electric power in the third relationship becomes zero or more, where generation of electric power is defined as a positive value.

The invention of Claim 11 based on Claim 9 provides the vehicle driving device, wherein the electric power-prioritized control is performed in accordance with an allowable electric power generation output of the another motor generator such that the sum of the left electric power and the right electric power in the third relationship falls within a range of the allowable electric power generation output.

The invention of Claim 12 based on Claim 9 provides the vehicle driving device, wherein when a failure in the another motor generator is detected or the another motor generator is in a power driving state, the electric power-prioritized control is performed such that the sum of the left electric power and the right electric power in the third relationship becomes zero or more, where generation of electric power is defined as a positive value.

The invention of Claim 13 based on Claim 1 provides the vehicle driving device, wherein the electric power-prioritized control is performed such that the sum of the left electric power and the right electric power in the third relationship becomes zero.

The invention of Claim 14 based on Claim 1 provides the vehicle driving device, wherein the electric power-prioritized control is performed such that the sum of the left electric power and the right electric power in the third relationship reaches a given target electric power.

The invention of Claim 15 based on Claim 1 provides the vehicle driving device, wherein in the electric power-prioritized control, the right and left motor generators are controlled such that the first relationship is satisfied as the second priority.

The invention of Claim 16 based on Claim 15 provides the vehicle driving device, wherein at the time of deceleration of the vehicle, the control is performed such that the third relationship is satisfied as the first priority and the first relationship is satisfied as the second priority.

The invention of Claim 17 based on Claim 1 provides the vehicle driving device, wherein in the electric power-prioritized control, the right and left motor generators are controlled such that the second relationship is satisfied as the second priority.

The invention of Claim 18 based on Claim 17 provides the vehicle driving device, wherein at the time of acceleration of the vehicle, the control is performed such that the third relationship is satisfied as the first priority and the second relationship is satisfied as the second priority.

The invention of Claim 19 based on any one of Claims 1 to 18 provides the vehicle driving device, wherein a left speed changer (e.g., a planetary gear type speed reducer 12A according to the after-mentioned embodiment) is provided on a power transmission path between the left wheel and the left motor generator, wherein a right speed changer (e.g., a planetary gear type speed reducer 12B according to the after-mentioned embodiment) is provided on a power transmission path between the right wheel and the right motor generator, wherein each of the right and left speed changers is a planetary gear type speed changer including first to third rotation elements, wherein the right and left motor generators are connected to the first rotation elements (e.g., sun gears 21A and 21B according to the after-mentioned embodiment) of the right and left speed changers, respectively, wherein the right and left wheels are connected to the second rotation elements (e.g., planetary carriers 23A and 23B according to the after-mentioned embodiment) of the right and left speed changers, respectively, wherein the third rotation elements (e.g., ring gears 24A and 24B according to the after-mentioned embodiment) of the right and left speed changers are connected to each other, and wherein a connection/disconnection means (e.g., hydraulic brakes 60A and 60B according to the after-mentioned embodiment) and a one-way power transmission unit (e.g., a one-way clutch 50 according to the after-mentioned embodiment) are provided in parallel with the third rotation elements, wherein the connection/disconnection means is disengaged or engaged to bring a motor generator side that is composed of the right and left motor generators and a wheel side that is composed of the right and left wheels to a disconnected state or a connected state, wherein the one-way power transmission unit becomes:

an engaged state when a forward rotational power is inputted to the wheel side from the motor generator side;

a disengaged state when an reverse rotational power is inputted to the wheel side from the motor generator side;

the disengaged state when a forward rotational power is inputted to the motor generator side from the wheel side; and the engaged state when an reverse rotational power is inputted to the motor generator side from the wheel side.

The invention of Claim 20 based on Claim 19 provides the vehicle driving device, wherein when the sum of the left electric power and the right electric power in the third relationship becomes zero or more, the connection/disconnection means is engaged, where generation of electric power is defined as a positive value.

The invention of Claim 21 based on Claim 19 provides the vehicle driving device, wherein when the sum of the left electric power and the right electric power in the third relationship is lower than a given value of zero or less, the connection/disconnection means is disengaged, where generation of electric power is defined as a positive value.

The invention of Claim 22 based on any one of Claims 19 to 21 provides the vehicle driving device, wherein the first, second and third rotation elements of the planetary gear type speed changers are sun gears, carriers, and ring gears, respectively.

To achieve the above object, the invention of Claim 23 provides a vehicle driving device (e.g., the rear wheel driving device 1 according to the after-mentioned embodiment) including:

a left motor generator (e.g., the electric motor 2A according to the after-mentioned embodiment) connected to a left wheel (e.g., the left rear wheel LWr according to the after-mentioned embodiment) of a vehicle;

a right motor generator (e.g., the electric motor 2B according to the after-mentioned embodiment) connected to a right wheel (e.g., the right rear wheel RWr according to the after-mentioned embodiment) of the vehicle; and a control device (e.g., the control device 8 according to the after-mentioned embodiment) for controlling the right and left motor generators, wherein the control device performs an electric power-prioritized control for controlling the right and left motor generators based on a sum of a left electric power which is generated or consumed by the left motor generator and a right electric power which is generated or consumed by the right motor generator.

Effects of the Invention

According to the invention of Claim 1, a requirement for electric power can be satisfied, thus making it possible to reduce the possibility of an excess or deficiency of electric power and damage to an electrical system.

According to the invention of Claim 2, the electric power-prioritized control is performed in accordance with the state of the power source, thus making it possible to avoid performing the electric power-prioritized control when it is unnecessary.

According to the invention of Claim 3, electric power can be stored, and the electric power-prioritized control is performed in accordance with the state of the battery, thus making it possible to drive the right and left motor generators suitably for the battery.

According to the invention of Claim 4, when the storage state is equal to or lower than the given level, it is possible to allow the sum of the left electric power and the right electric power to become zero or more, i.e., to bring about a state in which regeneration electric power is greater than power driving electric power, thus allowing electric power to be stored in the battery without being consumed by the battery.

According to the invention of Claim 5, when the storage state is equal to or higher than the given level, it is possible to allow the sum of the left electric power and the right electric power to become zero or less, i.e., to bring about a state in which power driving electric power is greater than regeneration electric power, thus allowing electric power to be consumed by the battery without being stored in the battery, and making it possible to prevent an overcharged state thereof.

According to the invention of Claim 6, electric power can be supplied and received within the range of the allowable input and output of the battery.

According to the invention of Claim 7, it is possible to prevent outflow and inflow of electric power from and into the battery when the temperature thereof is low, and to drive the right and left motor generators even when the temperature of the battery is low.

According to the invention of Claim 8, it is possible to prevent outflow and inflow of electric power from and into the battery at the time of a failure in the battery, and to drive the right and left motor generators even at the time of a failure in the battery.

According to the invention of Claim 9, electric power can be supplied from and received by the another motor generator, and the electric power-prioritized control is performed in accordance with the state of the another motor generator, thus making it possible to drive the right and left motor generators suitably for the another motor generator.

According to the invention of Claim 10, it is possible to avoid a deficiency of electric power.

According to the invention of Claim 11, electric power can be received within the range of the allowable electric power generation output of the another motor generator.

According to the invention of Claim 12, it is possible to drive the right and left motor generators even at the time of a failure in the another motor generator or when the motor generator is in the power driving state.

According to the invention of Claim 13, a balance of electric power between the right and left motor generators is achieved; therefore, no electric power is supplied from the battery and/or the another motor generator, and no electric power is supplied thereto, thus making it possible to drive the right and left motor generators irrespective of condition(s) of the battery and/or the another motor generator.

According to the invention of Claim 14, a balance of electric power between the right and left motor generators can allow the given target electric power to be reached, thus making it possible to cope with a situation where the battery or the another motor generator is out of order.

According to the invention of Claim 15, it is possible to satisfy a torque requirement in a front-rear direction while satisfying the requirement for electric power, thus enhancing roadability and stability.

According to the invention of Claim 16, priority (second priority) is given to the torque requirement in the front-rear direction rather than to a torque requirement in a turning direction at the time of deceleration, thus making it possible to perform deceleration with stability.

According to the invention of Claim 17, it is possible to satisfy the torque requirement in the turning direction while satisfying the requirement for electric power, thus enhancing turning performance.

According to the invention of Claim 18, priority (second priority) is given to the torque requirement in the turning direction rather than to the torque requirement in the front-rear direction at the time of acceleration, thus making it possible to perform acceleration while enhancing turning performance.

According to the invention of Claim 19, the connection/disconnection means is disengaged, thereby making it possible to allow or interrupt power transmission between the motor generator side and the wheel side. The one-way power transmission unit is provided in parallel with the connection/disconnection means; therefore, for example, when forward rotational power from the motor generators is inputted to the wheels to bring the one-way power transmission unit to the engaged state, power transmission is enabled by the one-way power transmission unit, thus making it possible to disengage the connection/disconnection means or reduce its engagement force.

According to the invention of Claim 20, when the sum of the left electric power and the right electric power is zero or more, a regeneration torque is inevitably greater due to a loss, and therefore, torque transmission between the motor generator side and the wheel side is reliably enabled by engaging the connection/disconnection means.

According to the invention of Claim 21, when the sum of the left electric power and the right electric power is less than zero and a power drive torque is greater than a regeneration torque, torque transmission between the motor generator side and the wheel side is enabled even when the connection/ disconnection means is disengaged.

According to the invention of Claim 22, savings in space can be obtained.

According to the invention of Claim 23, the requirement for electric power can be satisfied, thus making it possible to reduce the possibility of an excess or deficiency of electric power and damage to the electrical system.

BRIEF DESCRIPTION OF THE DRAWINGS

FIG. 11 is a table that provides relationships between a front wheel driving device and the rear wheel driving device in each vehicle state, together with operating states of electric motors and states of a hydraulic circuit.

MODE FOR CARRYING OUT THE INVENTION

First, one embodiment of a vehicle driving device according to the present invention will be described with reference to FIGS. 1 to 3.

Figure 1:
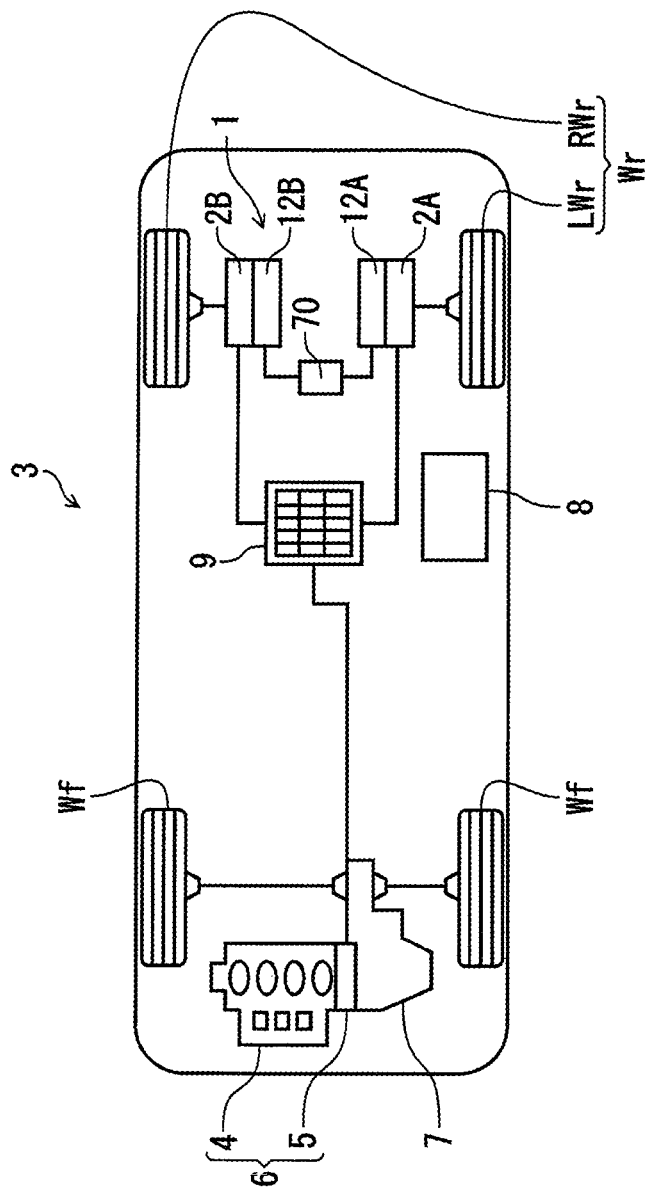
FIG. 1 is a block diagram illustrating a schematic configuration of a hybrid vehicle provided as one embodiment of a vehicle on which a vehicle driving device according to the present invention can be mounted.

A vehicle driving device according to the present invention utilizes an electric motor as a driving source for driving an axle, and is used in a vehicle having a driving system illustrated in FIG. 1, for example. The following description is based on an example in which the vehicle driving device is used to drive a rear wheel, but the vehicle driving device may alternatively be used to drive a front wheel.

A vehicle 3 illustrated in FIG. 1 is a hybrid vehicle that includes, in a vehicle front portion, a driving device 6 (hereinafter referred to as a "front wheel driving device") in which an internal combustion engine 4 and an electric motor 5 are connected in series. Power generated by the front wheel driving device 6 is transmitted to front wheels Wf via a transmission 7, while power generated by a driving device 1 (hereinafter referred to as a "rear wheel driving device") provided in a vehicle rear portion separately from the front wheel driving device 6 is transmitted to rear wheels Wr (RWr and LWr). The electric motor 5 of the front wheel driving device 6, and electric motors 2A and 2B of the rear wheel driving device 1 for the rear wheels Wr are electrically connected to a battery 9, so that electric power supply from the battery 9 and energy regeneration to the battery 9 are enabled. The reference character "8" denotes a control device for performing various types of control for the entire vehicle.

Figure 2:
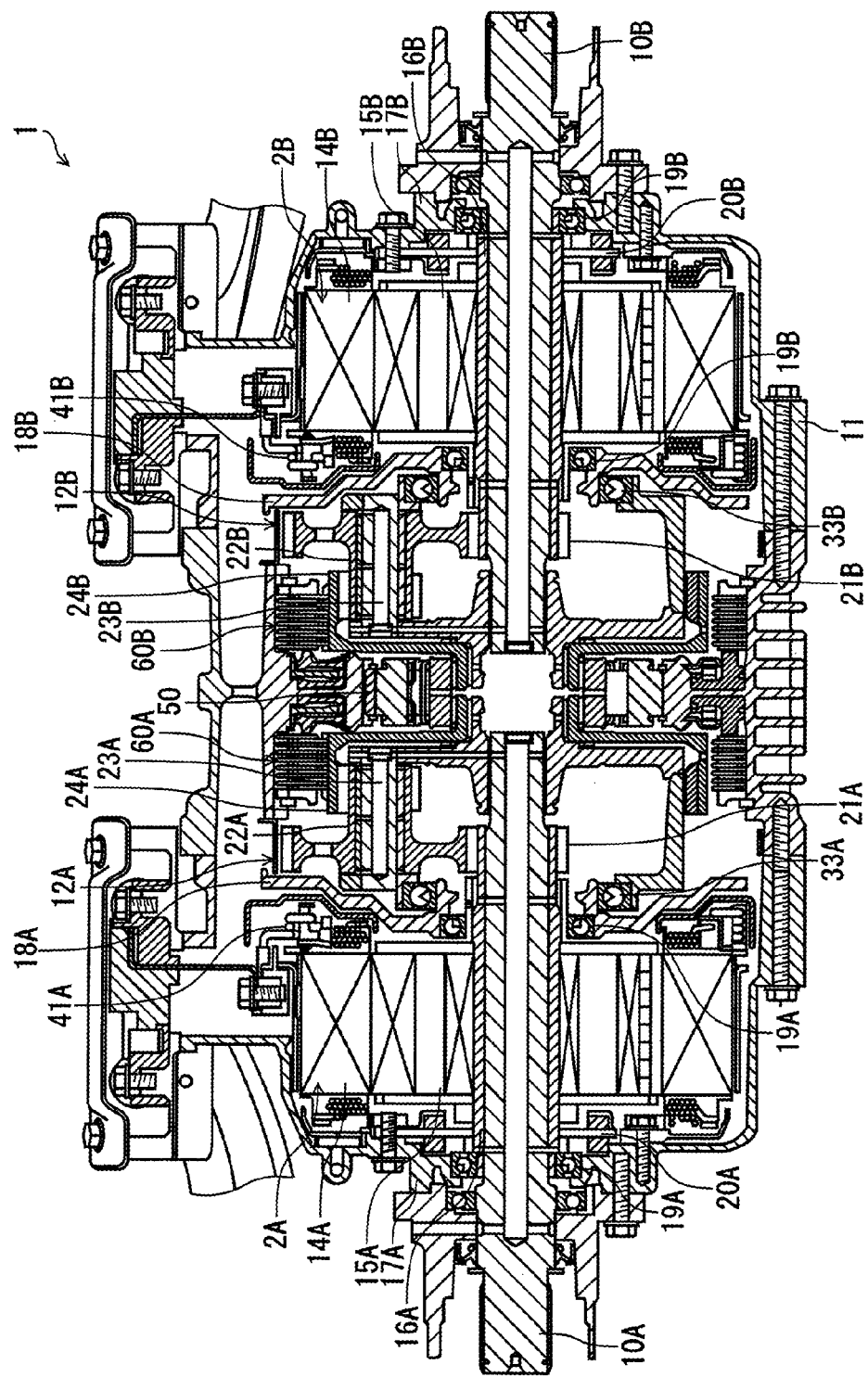
FIG. 2 is a longitudinal cross-sectional view of one embodiment of a rear wheel driving device.
Figure 3:
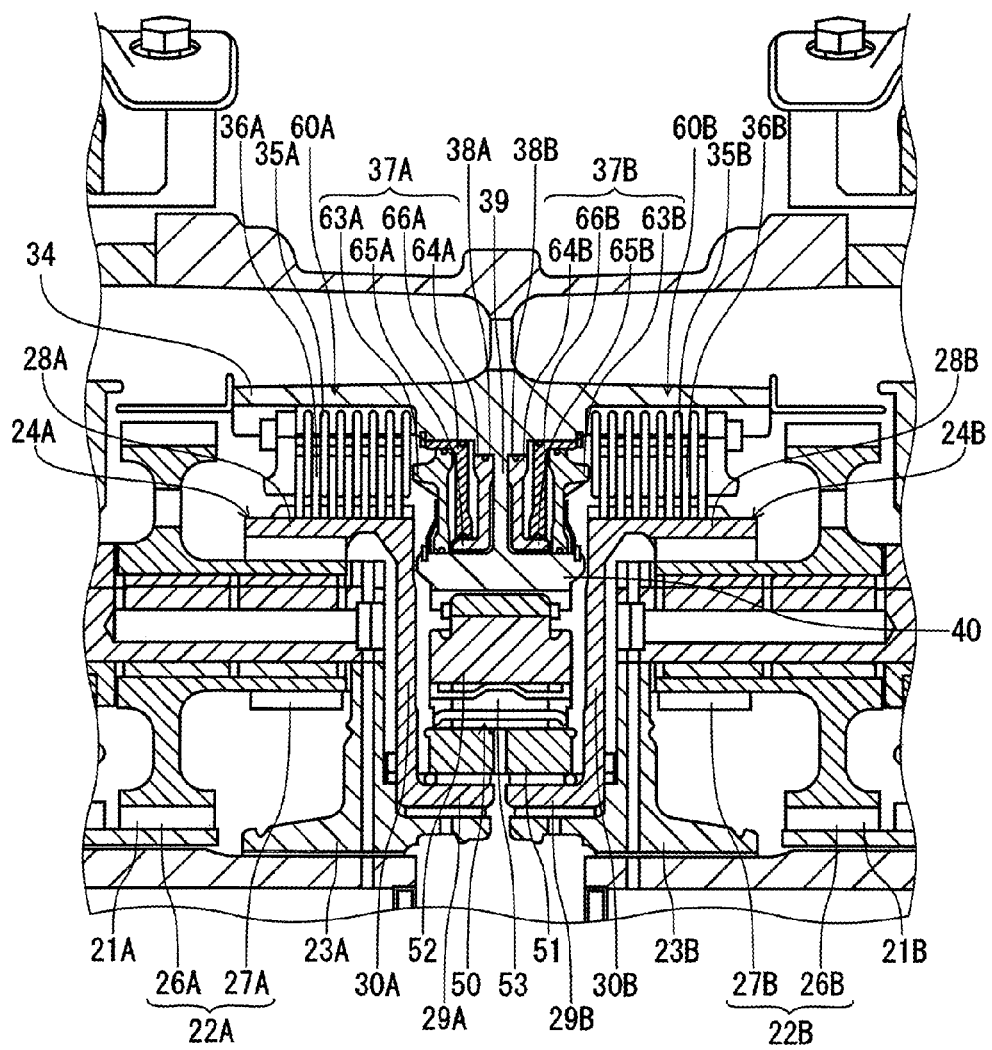
FIG. 3 is a partially enlarged view of the rear wheel driving device illustrated in FIG. 2.

FIG. 2 is an overall longitudinal cross-sectional view of the rear wheel driving device 1. Referring to FIG. 2, "10A" and "10B" denote right and left axles for the rear wheels Wr of the vehicle 3, and the axles 10A and 10B are disposed coaxially in a vehicle width direction. A speed reducer case 11 of the rear wheel driving device 1 is formed into a substantially cylindrical shape as a whole. Inside the speed reducer case 11, the electric motors 2A and 2B for driving the axles, and planetary gear type speed reducers 12A and 12B for reducing speed of driving rotation of the electric motors 2A and 2B are disposed coaxially with the axles 10A and 10B. The electric motor 2A and the planetary gear type speed reducer 12A function as a left wheel driving device for driving the left rear wheel LWr, and the electric motor 2B and the planetary gear type speed reducer 12B function as a right wheel driving device for driving the right rear wheel RWr. The electric motor 2A and planetary gear type speed reducer 12A, and the electric motor 2B and planetary gear type speed reducer 12B are disposed symmetrically in the vehicle width direction inside the speed reducer case 11. The speed reducer case 11 is supported by a not-illustrated frame serving as an outline of the vehicle 3.

Stators 14A and 14B of the electric motors 2A and 2B are fixed to inner right and left ends of the speed reducer case 11, respectively, and annular rotors 15A and 15B are rotatably disposed inward of the stators 14A and 14B, respectively. Cylindrical shafts 16A and 16B surrounding outer peripheries of the axles 10A and 10B are connected to inner peripheral portions of the rotors 15A and 15B, respectively. The cylindrical shafts 16A and 16B are supported by end walls 17A and 17B and intermediate walls 18A and 18B of the speed reducer case 11 via bearings 19A and 19B so that the cylindrical shafts 16A and 16B can rotate coaxially with respect to the axles 10A and 10B, respectively. The end walls 17A and 17B of the speed reducer case 11 which are located at outer peripheries of ends of the cylindrical shafts 16A and 16B are provided with resolvers 20A and 20B for feeding rotational position information of the rotors 15A and 15B back to a controller (not illustrated) of the electric motors 2A and 2B.

The planetary gear type speed reducers 12A and 12B include sun gears 21A and 21B, a plurality of planetary gears 22A and 22B that intermesh with the sun gears 21, planetary carriers 23A and 23B for supporting the planetary gears 22A and 22B, respectively, and ring gears 24A and 24B that intermesh with outer peripheral portions of the planetary gears 22A and 22B, respectively, so that driving forces generated by the electric motors 2A and 2B are inputted from the sun gears 21A and 21B, respectively, and reduced driving forces are outputted through the planetary carriers 23A and 23B, respectively.

The sun gears 21A and 21B are formed integrally with the cylindrical shafts 16A and 16B, respectively. For example, as illustrated in FIG. 3, the planetary gears 22A and 22B are double pinions including large-diameter first pinions 26A and 26B that directly intermesh with the sun gears 21A and 21B, and second pinions 27A and 27B whose diameters are smaller than those of the first pinions 26A and 26B, and are integrally formed in a state where the first pinions 26A and 26B and the second pinions 27A and 27B are coaxially and axially offset. The planetary gears 22A and 22B are supported by the planetary carriers 23A and 23B. Axial inner ends of the planetary carriers 23A and 23B are extended radially inward and spline-fitted to the axles 10A and 10B, and thus the planetary carriers 23A and 23B are supported so as to be rotatable together therewith, and in addition, the planetary carriers 23A and 23B are supported by the intermediate walls 18A and 18B via bearings 33A and 33B, respectively.

The intermediate walls 18A and 18B are adapted to serve as a partition between an electric motor containing space for containing the electric motor 2A and a speed reducer space for containing the planetary gear type speed reducer 12A, and a partition between an electric motor containing space for containing the electric motor 2B and a speed reducer space for containing the planetary gear type speed reducer 12B, respectively, and to bend so that an axial distance between the intermediate walls 18A and 18B is increased from outer diameter regions thereof to inner diameter regions thereof. The bearings 33A and 33B for supporting the planetary carriers 23A and 23B are disposed adjacent to the inner diameter regions of the intermediate walls 18A and 18B and to the planetary gear type speed reducers 12A and 12B, respectively, and bus rings 41A and 41B for the stators 14A and 14B are disposed adjacent to the outer diameter regions of the intermediate walls 18A and 18B and to the electric motors 2A and 2B, respectively (see FIG. 2).

The ring gears 24A and 24B include: gear portions 28A and 28B whose inner peripheral surfaces intermesh with the small-diameter second pinions 27A and 27B, respectively; small-diameter portions 29A and 29B having diameters smaller than those of the gear portions 28A and 28B and disposed to face each other at intermediate positions in the speed reducer case 11; and connection portions 30A and 30B through which axial inner ends of the gear portions 28A and 28B and axial outer ends of the small-diameter portions 29A and 29B are radially connected to each other. In this embodiment, settings are made so that maximum radii of the ring gears 24A and 24B are smaller than maximum distances of the first pinions 26A and 26B from the centers of the axles 10A and 10B, respectively. The small-diameter portions 29A and 29B are spline-fitted to an inner race 51 of a one-way clutch 50 which will be described later, and the ring gears 24A and 24B are rotated together with the inner race 51 of the one-way clutch 50.

A cylindrical space is ensured between the speed reducer case 11 and the ring gears 24A and 24B. Inside the space, hydraulic brakes 60A and 60B constituting braking means for the ring gears 24A and 24B, respectively, are disposed so as to be radially overlapped with the first pinions 26A and 26B and axially overlapped with the second pinions 27A and 27B, respectively. In the hydraulic brake 60A, a plurality of fixation plates 35A spline-fitted to an inner peripheral surface of a tubular outer diameter side support 34 extending axially along an inner diameter region of the speed reducer case 11, and a plurality of rotation plates 36A spline-fitted to an outer peripheral surface of the ring gear 24A are axially alternately arranged. In the hydraulic brake 60B, a plurality of fixation plates 35B spline-fitted to the inner peripheral surface of the tubular outer diameter side support 34 extending axially along the inner diameter region of the speed reducer case 11, and a plurality of rotation plates 36B spline-fitted to an outer peripheral surface of the ring gear 24B are axially alternately arranged. The plates 35A and 36A and the plates 35B and 36B are engaged and disengaged by annular pistons 37A and 37B, respectively. The pistons 37A and 37B are contained in annular cylinder chambers 38A and 38B provided along a right-left partition wall 39, extending from an intermediate position in the speed reducer case 11 toward the inner diameter region thereof, and between the outer diameter side support 34 and an inner diameter side support 40 connected to each other through the right-left partition wall 39, in such a manner that the pistons 37A and 37B are movable forward and backward therein. The pistons 37A and 37B are moved forward by introducing high pressure oil into the cylinder chambers 38A and 38B, and the pistons 37A and 37B are moved backward by discharging oil from the cylinder chambers 38A and 38B. Note that the hydraulic brakes 60A and 60B are connected to the electric oil pump 70.

More specifically, the piston 37A includes axially front and rear first and second piston walls 63A and 64A, and the piston 37B includes axially front and rear first and second piston walls 63B and 64B. The piston walls 63A and 64A are connected to each other through a cylindrical inner peripheral wall 65A, and the piston walls 63B and 64B are connected to each other through a cylindrical inner peripheral wall 65B. Accordingly, annular spaces opened radially outward are defined between the first and second piston walls 63A and 64A and between the first and second piston walls 63B and 64B, and each annular space is partitioned into axially right and left spaces by partition members 66A and 66B fixed to inner peripheral surfaces of outer walls of the cylinder chambers 38A and 38B. Spaces between the right-left partition wall 39 of the speed reducer case 11 and the second piston walls 64A and 64B are defined as first operation chambers S1 (see FIG. 4) into which high pressure oil is directly introduced. Spaces between the partition members 66A and 66B and the first piston walls 63A and 63B are defined as second operation chambers S2 (see FIG. 4) communicated with the first operation chambers S1 via through holes provided in the inner peripheral walls 65A and 65B. Spaces between the second piston walls 64A and 64B and the partition members 66A and 66B are communicated with atmospheric pressure.

In the hydraulic brakes 60A and 60B, oil is introduced into the first operation chambers S1 and the second operation chambers S2 from a hydraulic circuit 71 which will be described later, and thus the fixation plates 35A and 35B and the rotation plates 36A and 36B can be pressed against each other by the pressure of oil exerted on the first piston walls 63A and 63B and the second piston walls 64A and 64B. Accordingly, a large pressure receiving area can be provided by the axially right and left first and second piston walls 63A and 64A and the axially right and left first and second piston walls 63B and 64B, thus making it possible to obtain a large pressing force on the fixation plates 35A and 35B and the rotation plates 36A and 36B while keeping radial areas of the pistons 37A and 37B small.

In the hydraulic brakes 60A and 60B, the fixation plates 35A and 35B are supported by the outer diameter side support 34 extending from the speed reducer case 11, while the rotation plates 36A and 36B are supported by the ring gears 24A and 24B. Therefore, when the plates 35A and 35B and the plates 36A and 36B are pressed against each other by the pistons 37A and 37B, frictional engagement between the plates 35A and 36A and frictional engagement between the plates 35B and 36B exert a braking force on the ring gears 24A and 24B to cause fixation thereof. When the engagement of the plates 35A and 36A and the engagement of the plates 35B and 36B by the pistons 37A and 37B are released from this state, the ring gears 24A and 24B are allowed to rotate freely.

Specifically, the hydraulic brakes 60A and 60B serving as rotation restricting means for restricting rotation of the ring gears 24A and 24B lock the ring gears 24A and 24B at the time of engagement to bring a power transmission path between the first and second electric motors 2A and 2B and the rear wheels Wr to a connected state in which power is transmittable, and allow rotation of the ring gears 24A and 24B at the time of disengagement to bring the power transmission path between the first and second electric motors 2A and 2B and the rear wheels Wr to a disconnected state in which power cannot be transmitted.

A space is also ensured between the connection portions 30A and 30B of the ring gears 24A and 24B facing each other axially. In this space, there is disposed the one-way clutch 50 that transmits power to the ring gears 24A and 24B only in one direction and prevents power from being transmitted thereto in the other direction. In the one-way clutch 50, a large number of sprags 53 are interposed between the inner race 51 and outer race 52, and the inner race 51 is adapted so as to be rotated together with the small-diameter portions 29A and 29B of the ring gears 24A and 24B since the inner race 51 is spline-fitted thereto. The inner diameter side support 40 determines positioning of the outer race 52 and prevents rotation thereof.

The one-way clutch 50 is adapted so as to lock rotation of the ring gears 24A and 24B by being engaged when the vehicle 3 moves forward by power generated by the electric motors 2A and 2B. More specifically, the one-way clutch 50 enters an engaged state when rotational power is inputted to the wheels Wr from the electric motors 2A and 2B in a forward direction (i.e., a rotational direction when the vehicle 3 is moved forward), and enters a disengaged state when rotational power is inputted to the wheels Wr from the electric motors 2A and 2B in the reverse direction; furthermore, the one-way clutch 50 enters the disengaged state when rotational power is inputted to the electric motors 2A and 2B from the wheels Wr in the forward direction, and enters the engaged state when rotational power is inputted to the electric motors 2A and 2B from the wheels Wr in the reverse direction. In other words, the one-way clutch 50 allows, when it is not engaged, rotation of the ring gears 24A and 24B in one direction which is caused by torques of the first and second electric motors 2A and 2B in the reverse direction, and the one-way clutch 50 restricts, when it is engaged, rotation of the ring gears 24A and 24B in the reverse direction which is caused by torques of the first and second electric motors 2A and 2B in the forward direction. Note that the "torque in the reverse direction" refers to a torque produced in a direction in which rotation in the reverse direction is increased or a torque produced in a direction in which rotation in the forward direction is decreased.

As described above, in the rear wheel driving device 1 according to the present embodiment, the one-way clutch 50 and the hydraulic brakes 60A and 60B are provided in parallel on the power transmission path between the electric motors 2A and 2B and the wheels Wr. Note that the two hydraulic brakes 60A and 60B do not necessarily have to be provided, but only one of the hydraulic brakes 60A and 60B may alternatively be provided so that a space for the other hydraulic brake is used as a breather chamber.

Next, the hydraulic circuit constituting a hydraulic control device of the rear wheel driving device 1 will be described with reference to FIGS. 4 to 7.

The hydraulic circuit 71 is configured so that oil sucked through a suction port 70a provided in an oil pan 80 and discharged from the electric oil pump 70 can be supplied to the first operation chambers S1 of the hydraulic brakes 60A and 60B via a low pressure oil passage switching valve 73 and a brake oil passage switching valve 74, and can also be supplied, via the low pressure oil passage switching valve 73, to portions 91 of the electric motors 2A and 2B and the planetary gear type speed reducers 12A and 12B, for example, which are to be lubricated/cooled. Oil, discharged from the electric oil pump 70 and supplied to the portions 91 of the electric motors 2A and 2B and the planetary gear type speed reducers 12A and 12B, for example, which are to be lubricated/cooled, is stored in the speed reducer case 11. Lower portions of the planetary carriers 23A and 23B and lower portions of the electric motors 2A and 2B are submerged in oil. The electric oil pump 70 is allowed to operate (run) at least in two modes, i.e., a high pressure mode and a low pressure mode, by an electric motor 90 consisting of a position sensorless/brushless DC motor, and is controlled by PID control; furthermore, hydraulic pressure can be adjusted in each of the two modes. Note that the reference character "92" denotes a sensor for detecting oil temperature and hydraulic pressure of the brake oil passage 77.

The low pressure oil passage switching valve 73 is connected with: a first line oil passage 75a included in a line oil passage 75 and adjacent to the electric oil pump 70; a second line oil passage 75b included in the line oil passage 75 and adjacent to the brake oil passage switching valve 74; a first low pressure oil passage 76a communicated with the portions 91 to be lubricated/cooled; and a second low pressure oil passage 76b communicated with the portions 91 to be lubricated/cooled. The low pressure oil passage switching valve 73 includes: a valve body 73a that always allows communication between the first line oil passage 75a and the second line oil passage 75b, and selectively allows communication between the line oil passage 75 and the first low pressure oil passage 76a or the second low pressure oil passage 76b; a spring 73b for urging the valve body 73a in a direction in which the line oil passage 75 and the first low pressure oil passage 76a are communicated with each other (i.e., rightward in FIG. 4); and an oil chamber 73c that presses the valve body 73a in a direction in which the line oil passage 75 and the second low pressure oil passage 76b are communicated with each other (i.e., leftward in FIG. 4) by the hydraulic pressure of the line oil passage 75. Accordingly, the valve body 73a is urged in the direction, in which the line oil passage 75 and the first low pressure oil passage 76a are communicated with each other (i.e., rightward in FIG. 4), by the spring 73b, and is pressed in the direction, in which the line oil passage 75 and the second low pressure oil passage 76b are communicated with each other (i.e., leftward in FIG. 4), by the hydraulic pressure of the line oil passage 75 applied to the oil chamber 73c located at a right end of the low pressure oil passage switching valve 73 in FIG. 4.

Figure 5A:
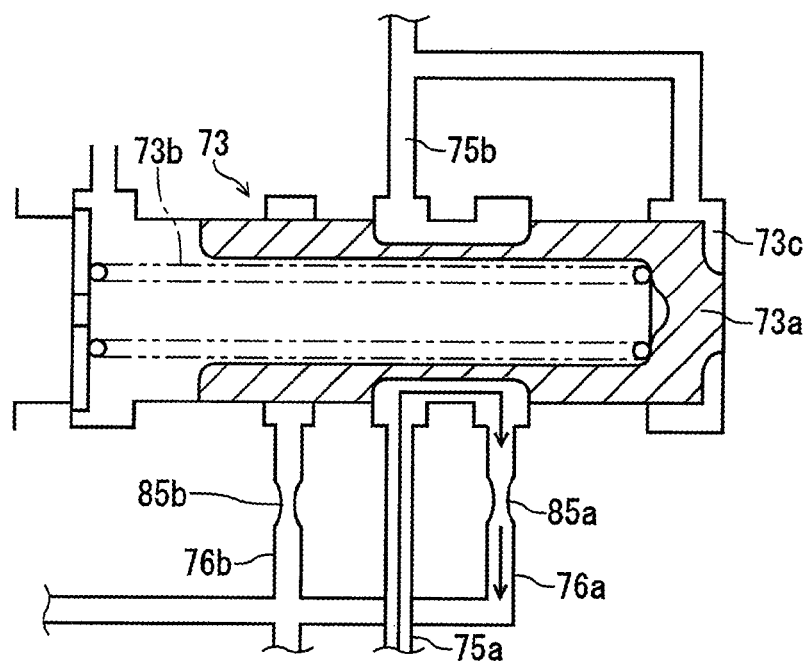
FIG. 5A is an explanatory diagram of a low pressure oil passage switching valve when its valve body is located at a low pressure side position.
Figure 5B:
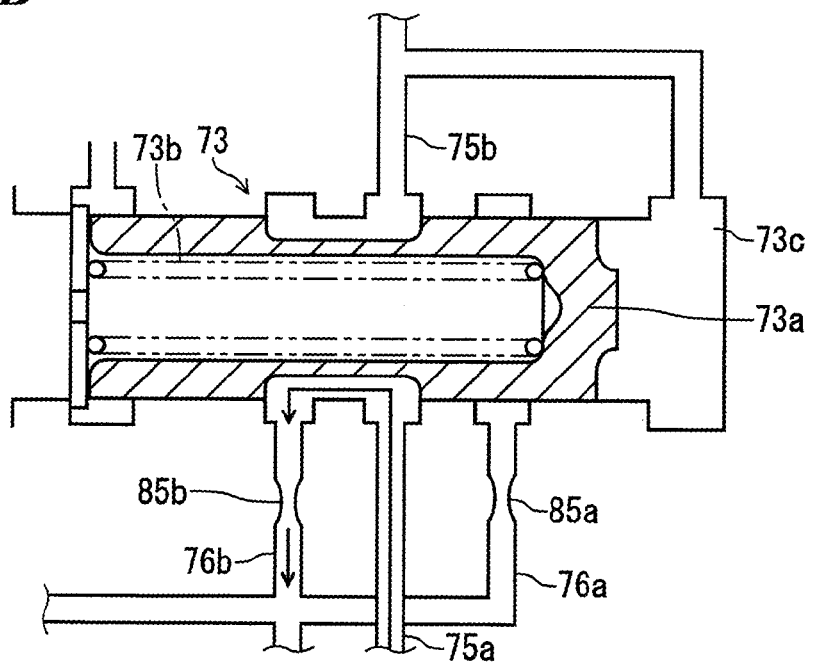
FIG. 5B is an explanatory diagram of the low pressure oil passage switching valve when its valve body is located at a high pressure side position.

In this embodiment, the urging force of the spring 73b is set so that, as illustrated in FIG. 5A, the hydraulic pressure of the line oil passage 75 applied to the oil chamber 73c during operation of the electric oil pump 70 in the low pressure mode does not move the valve body 73a, and thus the line oil passage 75 is shut off from the second low pressure oil passage 76b and communicated with the first low pressure oil passage 76a (the position of the valve body 73a in FIG. 5A will hereinafter be referred to as a "low pressure side position"), and so that, as illustrated in FIG. 5B, the hydraulic pressure of the line oil passage 75 applied to the oil chamber 73c during operation of the electric oil pump 70 in the high pressure mode moves the valve body 73a, and thus the line oil passage 75 is shut off from the first low pressure oil passage 76a and communicated with the second low pressure oil passage 76b (the position of the valve body 73a in FIG. 5B will hereinafter be referred to as a "high pressure side position").

The brake oil passage switching valve 74 is connected with the second line oil passage 75b included in the line oil passage 75, and the brake oil passage 77 connected to the hydraulic brakes 60A and 60B, and is also connected via a high position drain 78 with a reservoir 79. The brake oil passage switching valve 74 includes: a valve body 74a that allows communication between the second line oil passage 75b and the brake oil passage 77 or shuts off the second line oil passage 75b and the brake oil passage 77 from each other; a spring 74b for urging the valve body 74a in a direction in which the second line oil passage 75b and the brake oil passage 77 are shut off from each other (i.e., rightward in FIG. 4); and an oil chamber 74c that presses the valve body 74a in a direction in which the second line oil passage 75b and the brake oil passage 77 are communicated with each other (i.e., leftward in FIG. 4) by the hydraulic pressure of the line oil passage 75. Accordingly, the valve body 74a is urged in the direction, in which the second line oil passage 75b and the brake oil passage 77 are shut off from each other (i.e., rightward in FIG. 4), by the spring 74b, and can be pressed in the direction, in which the second line oil passage 75b and the brake oil passage 77 are communicated with each other (i.e., leftward in FIG. 4), by the hydraulic pressure of the line oil passage 75 applied to the oil chamber 74c.

Figure 6A:
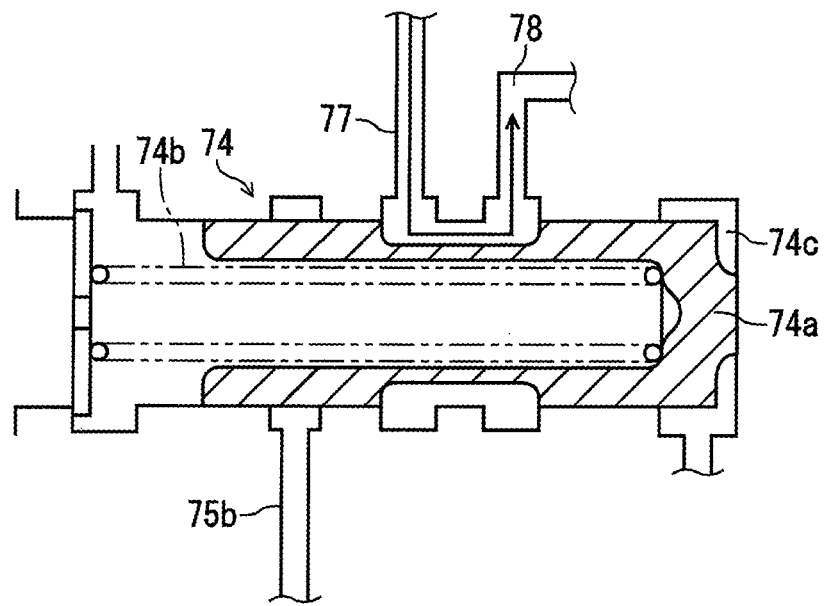
FIG. 6A is an explanatory diagram of a brake oil passage switching valve when its valve body is located at a valve closing position.
Figure 6B:
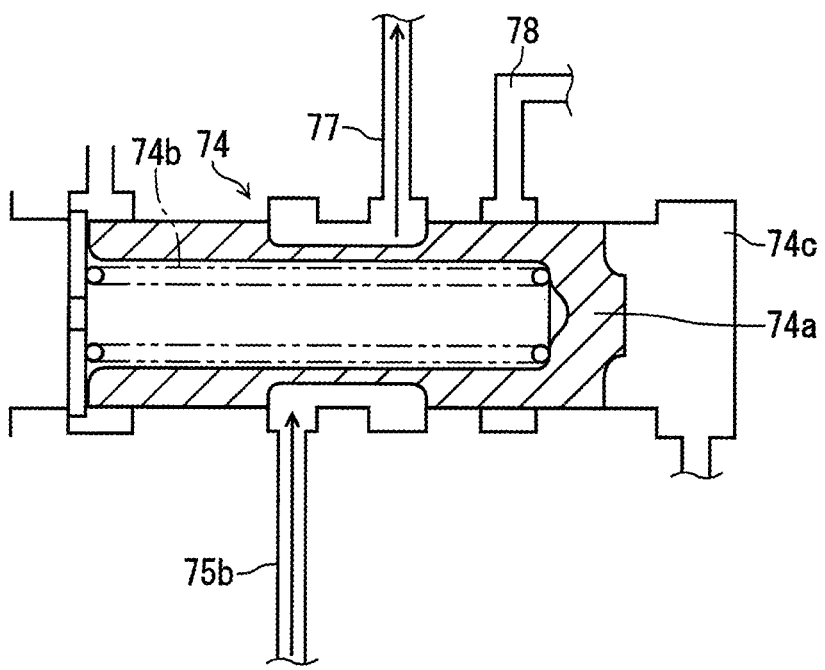
FIG. 6B is an explanatory diagram of the brake oil passage switching valve when its valve body is located at a valve opening position.

The urging force of the spring 74b is set so that the hydraulic pressure of the line oil passage 75 applied to the oil chamber 74c during operation of the electric oil pump 70 in the low and high pressure modes moves the valve body 74a from a valve closing position of FIG. 6A to a valve opening position of FIG. 6B, and thus the brake oil passage 77 is shut off from the high position drain 78 and communicated with the second line oil passage 75b. In other words, regardless of whether the electric oil pump 70 is operated in the low pressure mode or the high pressure mode, the hydraulic pressure of the line oil passage 75 applied to the oil chamber 74c exceeds the urging force of the spring 74b, and thus the brake oil passage 77 is shut off from the high position drain 78 and communicated with the second line oil passage 75b.

In a state where the second line oil passage 75b and the brake oil passage 77 are shut off from each other, the hydraulic brakes 60A and 60B are communicated with the reservoir 79 via the brake oil passage 77 and the high position drain 78. In this embodiment, the reservoir 79 is located vertically higher than the oil pan 80. More preferably, the reservoir 79 is disposed so that its vertically uppermost region is located vertically higher than midpoints between vertically uppermost and lowermost regions of the first operation chambers S1 of the hydraulic brakes 60A and 60B. Accordingly, in a state where the brake oil passage switching valve 74 is closed, oil stored in the first operation chambers S1 of the hydraulic brakes 60A and 60B is not directly discharged to the oil pan 80, but is discharged to the reservoir 79 and stored therein. Note that oil which has overflowed the reservoir 79 is discharged to the oil pan 80. An end 78a of the high position drain 78 located adjacent to the reservoir 79 is connected to a bottom surface of the reservoir 79.

The oil chamber 74c of the brake oil passage switching valve 74 can be connected to the second line oil passage 75b of the line oil passage 75 via a pilot oil passage 81 and a solenoid valve 83. The solenoid valve 83 includes an electromagnetic three-way valve controlled by the control device 8, so that when a solenoid 174 (see FIGS. 7A and 7B) of the solenoid valve 83 is not energized by the control device 8, the second line oil passage 75b is connected to the pilot oil passage 81 and thus the hydraulic pressure of the line oil passage 75 is applied to the oil chamber 74c.

Figure 7A:
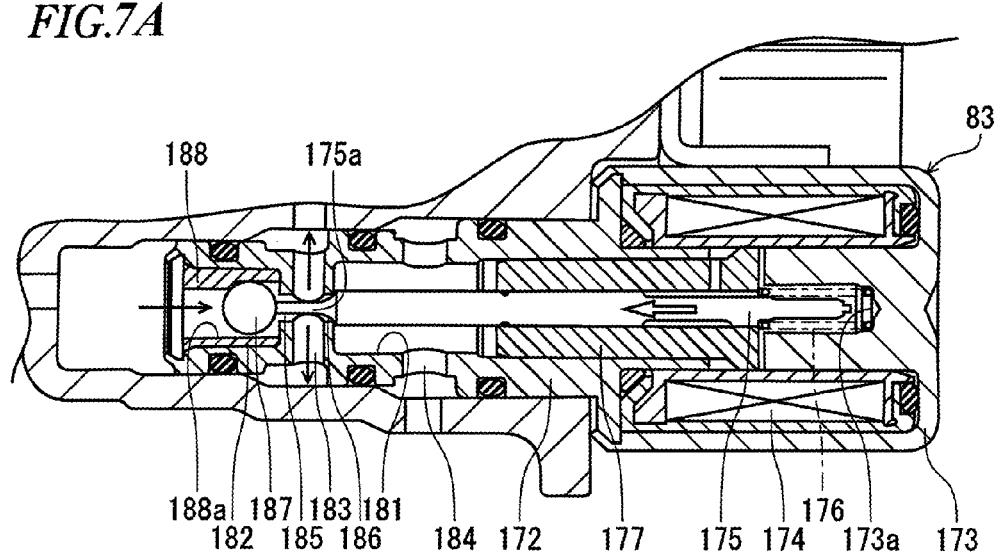
FIG. 7A is an explanatory diagram of a solenoid valve when it is not energized.
Figure 7B:
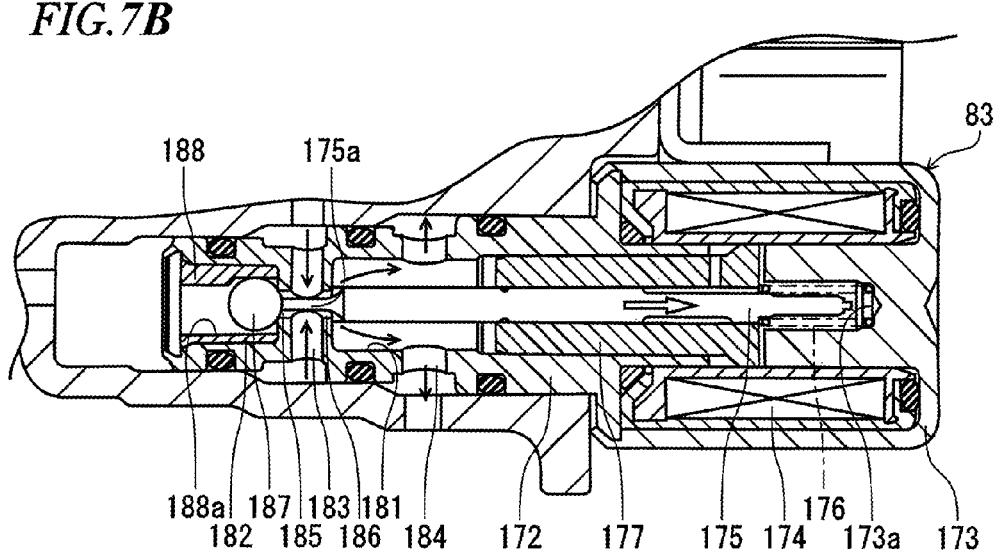
FIG. 7B is an explanatory diagram of the solenoid valve when it is energized.

As illustrated in FIGS. 7A and 7B, the solenoid valve 83 includes: a three-way valve member 172; the solenoid 174 that is provided in a case member 173 and excited upon reception of electric power supplied via a not-illustrated cable; a solenoid valve body 175 that is pulled rightward upon reception of an excitation force of the solenoid 174; a solenoid spring 176 which is contained in a spring holding concave 173a provided at a center of the case member 173 and by which the solenoid valve body 175 is urged leftward; and a guide member 177 which is provided inside the three-way valve member 172 and through which forward and backward movements of the solenoid valve body 175 are guided in a slidable manner.

The three-way valve member 172 is an approximately cylindrical member having a bottom. The three-way valve member 172 includes: a right concave hole 181 provided from a right end of the three-way valve member 172 to an approximately intermediate position thereof along a center line of the three-way valve member 172; a left concave hole 182 provided from a left end of the three-way valve member 172 to a position close to the right concave hole 181 along the center line; a first radial hole 183 located between the right concave hole 181 and the left concave hole 182 and provided along a direction orthogonal to the center line; a second radial hole 184 provided along a direction orthogonal to the center line so as to be communicated with an approximately intermediate region of the right concave hole 181; a first axial hole 185 which is provided along the center line and through which the left concave hole 182 and the first radial hole 183 are communicated with each other; and a second axial hole 186 which is provided along the center line and through which the first radial hole 183 and the right concave hole 181 are communicated with each other.

A ball 187 for opening/closing the first axial hole 185 is inserted into a bottom of the left concave hole 182 of the three-way valve member 172 so as to be movable in a lateral direction, and a cap 188 for restricting detachment of the ball 187 is fitted into an inlet side region of the left concave hole 182. In the cap 188, a through hole 188a communicated with the first axial hole 185 is provided along the center line.

The second axial hole 186 is opened/closed by contact or non-contact of a root portion of an opening/closing protrusion 175a provided at a left end of the solenoid valve body 175 that moves laterally. The ball 187 for opening/closing the first axial hole 185 is moved laterally by a tip of the opening/closing protrusion 175a of the solenoid valve body 175 that is moved laterally.

The solenoid valve 83 is operated as follows. As illustrated in FIG. 7A, when the solenoid 174 is not energized (i.e., when electric power is not supplied thereto), the solenoid valve body 175 is moved leftward upon reception of an urging force of the solenoid spring 176, and the tip of the opening/closing protrusion 175a of the solenoid valve body 175 pushes the ball 187; thus, the first axial hole 185 is opened, and the root portion of the opening/closing protrusion 175a of the solenoid valve body 175 comes into contact with the second axial hole 186, thereby closing the second axial hole 186. As a result, the second line oil passage 75b, included in the line oil passage 75, is communicated with the oil chamber 74c via the first axial hole 185, the first radial hole 183 and the pilot oil passage 81 (hereinafter, the position of the solenoid valve body 175 in FIG. 7A may be referred to as a "valve opening position").

As illustrated in FIG. 7B, when the solenoid 174 is energized (i.e., when electric power is supplied thereto), the solenoid valve body 175 is moved rightward against the urging force of the solenoid spring 176 upon reception of the excitation force of the solenoid 174, and the hydraulic pressure applied through the through hole 188a pushes the ball 187; thus, the first axial hole 185 is closed, and the root portion of the opening/closing protrusion 175a of the solenoid valve body 175 goes away from the second axial hole 186, thereby opening the second axial hole 186. As a result, oil stored in the oil chamber 74c is discharged to the oil pan 80 via the first radial hole 183, the second axial hole 186 and the second radial hole 184, and the second line oil passage 75b and the pilot oil passage 81 are shut off from each other (hereinafter, the position of the solenoid valve body 175 in FIG. 7B may be referred to as a "valve closing position").

Referring again to FIG. 4, in the hydraulic circuit 71, the first low pressure oil passage 76a and the second low pressure oil passage 76b are merged with each other in a downstream region to constitute a common low pressure oil passage 76c. The merged region is connected with a relief valve 84 that allows, when a line pressure of the common low pressure oil passage 76c is equal to or higher than a given pressure, oil in the common low pressure oil passage 76c to be discharged to the oil pan 80 via a relief drain 86 to cause a reduction in hydraulic pressure.

In this embodiment, as illustrated in FIGS. 5A and 5B, the first low pressure oil passage 76a and the second low pressure oil passage 76b are provided with orifices 85a and 85b serving as flow passage resistance means, respectively. The orifice 85a of the first low pressure oil passage 76a is adapted to have a diameter larger than that of the orifice 85b of the second low pressure oil passage 76b. Accordingly, a flow passage resistance of the second low pressure oil passage 76b is greater than that of the first low pressure oil passage 76a, and the amount of pressure reduction in the second low pressure oil passage 76b during operation of the electric oil pump 70 in the high pressure mode is greater than the amount of pressure reduction in the first low pressure oil passage 76a during operation of the electric oil pump 70 in the low pressure mode; hence, the hydraulic pressures of the common low pressure oil passage 76c in the high pressure mode and the low pressure mode are substantially equal to each other.

As described above, the low pressure oil passage switching valve 73 connected to the first low pressure oil passage 76a and the second low pressure oil passage 76b is operated as follows. During operation of the electric oil pump 70 in the low pressure mode, the urging force of the spring 73b exceeds the hydraulic pressure inside the oil chamber 73c, and the valve body 73a is located at the low pressure side position due to the urging force of the spring 73b, so that the line oil passage 75 is shut off from the second low pressure oil passage 76b and communicated with the first low pressure oil passage 76a. Oil flowing through the first low pressure oil passage 76a is reduced in pressure upon reception of the flow passage resistance of the orifice 85a, and then reaches, via the common low pressure oil passage 76c, the portions 91 to be lubricated/cooled. During operation of the electric oil pump 70 in the high pressure mode, the hydraulic pressure inside the oil chamber 73c exceeds the urging force of the spring 73b, and the valve body 73a is located at the high pressure side position against the urging force of the spring 73b, so that the line oil passage 75 is shut off from the first low pressure oil passage 76a and communicated with the second low pressure oil passage 76b. Oil flowing through the second low pressure oil passage 76b is reduced in pressure upon reception of the flow passage resistance of the orifice 85b which is greater than that of the orifice 85a, and then reaches, via the common low pressure oil passage 76c, the portions 91 to be lubricated/cooled.

Accordingly, when the electric oil pump 70 is switched from the low pressure mode to the high pressure mode, switching is made automatically from the oil passage with the smaller flow passage resistance to the oil passage with the greater flow passage resistance in response to a change in the hydraulic pressure of the line oil passage 75; thus, during the high pressure mode, excessive supply of oil to the portions 91 to be lubricated/cooled is prevented.

Oil passages located between the common low pressure oil passage 76c and the portions 91 to be lubricated/cooled are provided with a plurality of orifices 85c serving as additional flow passage resistance means. The plurality of orifices 85c are set so that a minimum flow passage cross-sectional area of the orifice 85a of the first low pressure oil passage 76a is smaller than a minimum flow passage cross-sectional area of the plurality of orifices 85c. In other words, the flow passage resistance of the orifice 85a of the first low pressure oil passage 76a is set to be greater than a flow passage resistance of the plurality of orifices 85c. In this case, the minimum flow passage cross-sectional area of the plurality of orifices 85c is a total sum of the minimum flow passage cross-sectional areas of the orifices 85c. Thus, an adjustment can be made so that a desired amount of oil is allowed to flow by using the orifice 85a of the first low pressure oil passage 76a and the orifice 85b of the second low pressure oil passage 76b.

In this embodiment, the control device 8 (see FIG. 1) is a control device for performing various types of control for the entire vehicle. Data to be inputted to the control device 8 include: a vehicle speed; a steering angle; an accelerator pedal opening AP; a shift position; a state of charge SOC of the battery 9; and an oil temperature. Signals to be outputted from the control device 8 include: a signal for controlling the internal combustion engine 4; a signal for controlling the electric motors 2A and 2B; and a control signal for controlling the electric oil pump 70.

Specifically, the control device 8 at least functions as: an electric motor control device for controlling the electric motors 2A and 2B; and a connection/disconnection means control device for controlling the hydraulic brakes 60A and 60B serving as connection/disconnection means. The control device 8, functioning as the connection/disconnection means control device, controls the electric oil pump 70 and the solenoid 174 of the solenoid valve 83 based on driving states of the electric motors 2A and 2B and/or driving commands (driving signals) for the electric motors 2A and 2B.

Next, how the hydraulic circuit 71 of the rear wheel driving device 1 is operated will be described.

Figure 4:
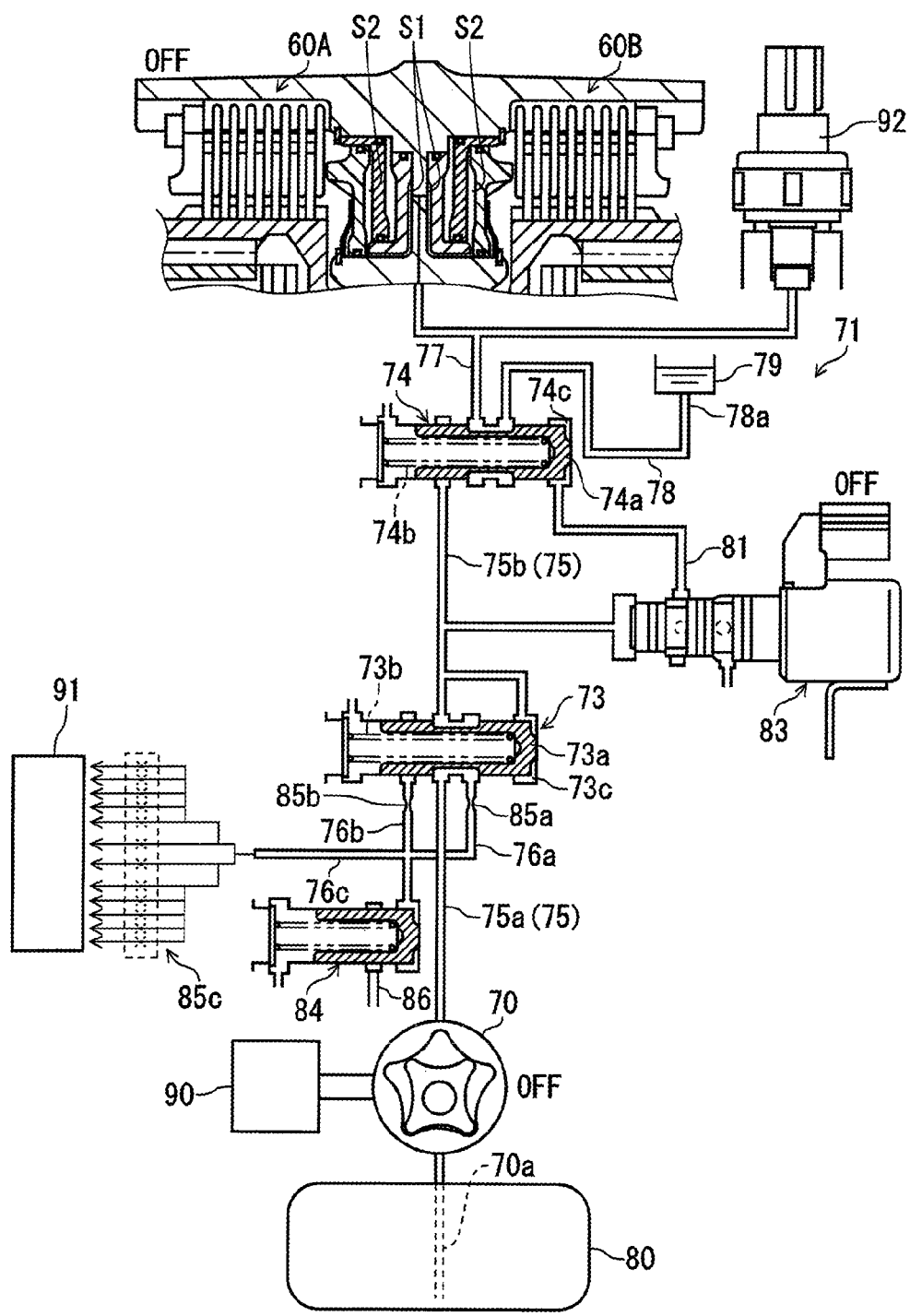
FIG. 4 is a hydraulic circuit diagram of a hydraulic control device for controlling hydraulic brakes, and illustrates a state where no hydraulic pressure is supplied.

FIG. 4 illustrates the hydraulic circuit 71 in a state where the hydraulic brakes 60A and 60B are disengaged during stoppage of the vehicle. In this state, the control device 8 does not cause the electric oil pump 70 to run. Thus, the valve body 73a of the low pressure oil passage switching valve 73 is located at the low pressure side position, the valve body 74a of the brake oil passage switching valve 74 is located at the valve closing position, and no hydraulic pressure is supplied to the hydraulic circuit 71.

Figure 8:
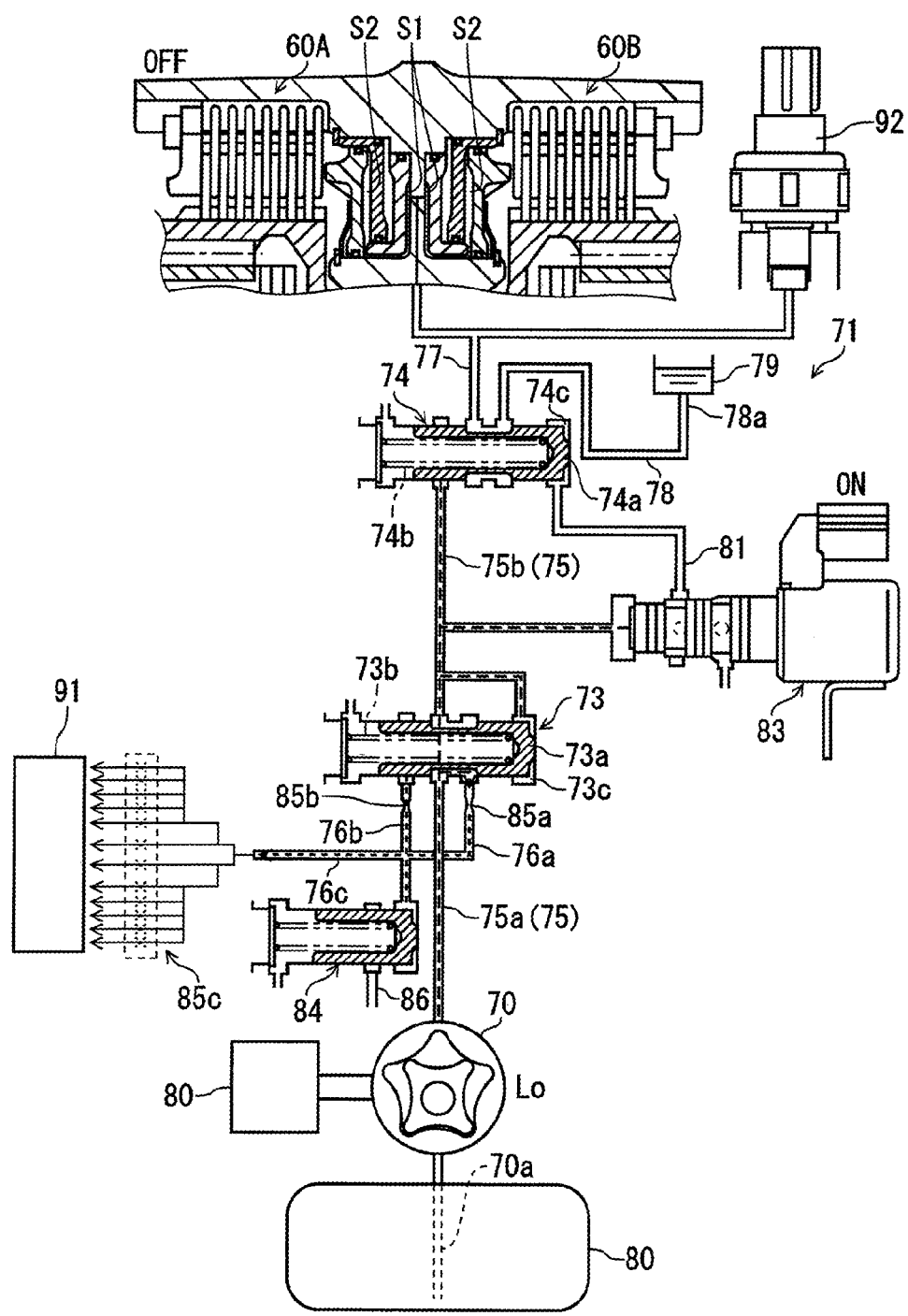
FIG. 8 is a hydraulic circuit diagram of the hydraulic control device when the hydraulic brakes are disengaged (EOP: low pressure mode) during traveling.

FIG. 8 illustrates a state where the hydraulic brakes 60A and 60B are disengaged during traveling of the vehicle. In this state, the electric oil pump 70 is operated in the low pressure mode by the control device 8. The control device 8 energizes the solenoid 174 of the solenoid valve 83, and the second line oil passage 75b and the pilot oil passage 81 are shut off from each other. Thus, the valve body 74a of the brake oil passage switching valve 74 is located at the valve closing position due to the urging force of the spring 74b, and the second line oil passage 75b and the brake oil passage 77 are shut off from each other; in addition, the brake oil passage 77 and the high position drain 78 are communicated with each other, and the hydraulic brakes 60A and 60B are disengaged. The brake oil passage 77 is connected to the reservoir 79 via the high position drain 78.

In the low pressure oil passage switching valve 73, the urging force of the spring 73b exceeds the hydraulic pressure of the line oil passage 75 applied to the oil chamber 73c at the right end of the low pressure oil passage switching valve 73 in FIG. 8 during operation of the electric oil pump 70 in the low pressure mode. Hence, the valve body 73a is located at the low pressure side position, and the line oil passage 75 is shut off from the second low pressure oil passage 76b and communicated with the first low pressure oil passage 76a. Thus, oil in the line oil passage 75 is reduced in pressure through the orifice 85a via the first low pressure oil passage 76a, and is then supplied to the portions 91 to be lubricated/cooled.

Figure 9:
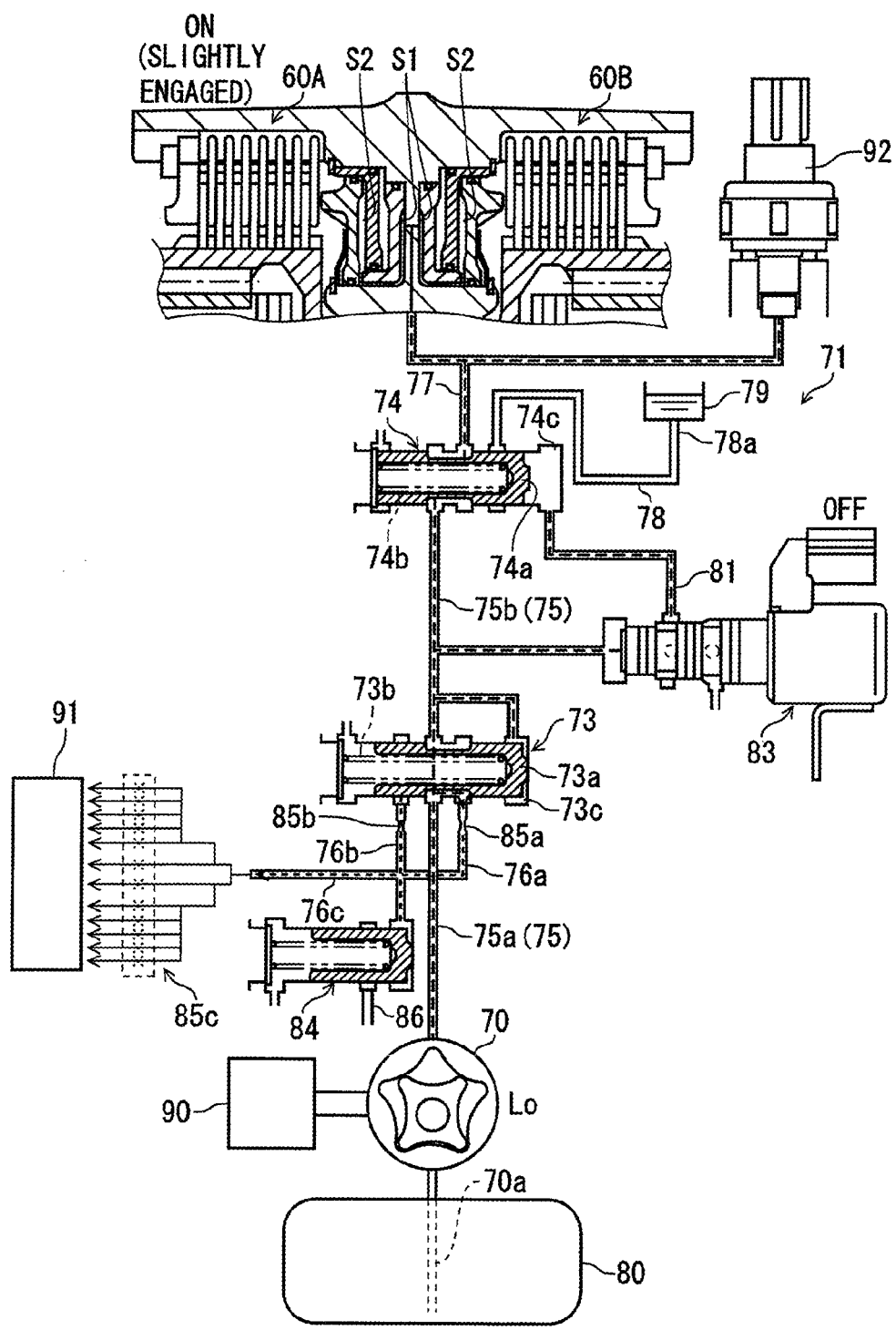
FIG. 9 is a hydraulic circuit diagram of the hydraulic control device when the hydraulic brakes are slightly engaged (EOP: low pressure mode).

FIG. 9 illustrates the hydraulic circuit 71 in a state where the hydraulic brakes 60A and 60B are slightly engaged. Note that the "state where the hydraulic brakes 60A and 60B are slightly engaged" refers to a state where power is transmittable but the hydraulic brakes 60A and 60B are engaged by an engagement force lower than an engagement force by which the hydraulic brakes 60A and 60B are brought to an engaged state. In this case, the electric oil pump 70 is operated in the low pressure mode by the control device 8. The control device 8 stops energization to the solenoid 174 of the solenoid valve 83 to apply the hydraulic pressure of the second line oil passage 75b to the oil chamber 74c of the brake oil passage switching valve 74. Thus, the hydraulic pressure inside the oil chamber 74c exceeds the urging force of the spring 74b, so that the valve body 74a is located at the valve opening position, and the brake oil passage 77 and the high position drain 78 are shut off from each other; in addition, the second line oil passage 75b and the brake oil passage 77 are communicated with each other, and the hydraulic brakes 60A and 60B are slightly engaged.

Also in this case, similarly to the case where the hydraulic brakes 60A and 60B are disengaged, the urging force of the spring 73b exceeds the hydraulic pressure of the line oil passage 75 applied to the oil chamber 73c at the right end of the low pressure oil passage switching valve 73 in FIG. 9 during operation of the electric oil pump 70 in the low pressure mode; hence, in the low pressure oil passage switching valve 73, the valve body 73a is located at the low pressure side position, and the line oil passage 75 is shut off from the second low pressure oil passage 76b and communicated with the first low pressure oil passage 76a. Thus, oil in the line oil passage 75 is reduced in pressure through the orifice 85a via the first low pressure oil passage 76a, and is then supplied to the portions 91 to be lubricated/cooled.

Figure 10:
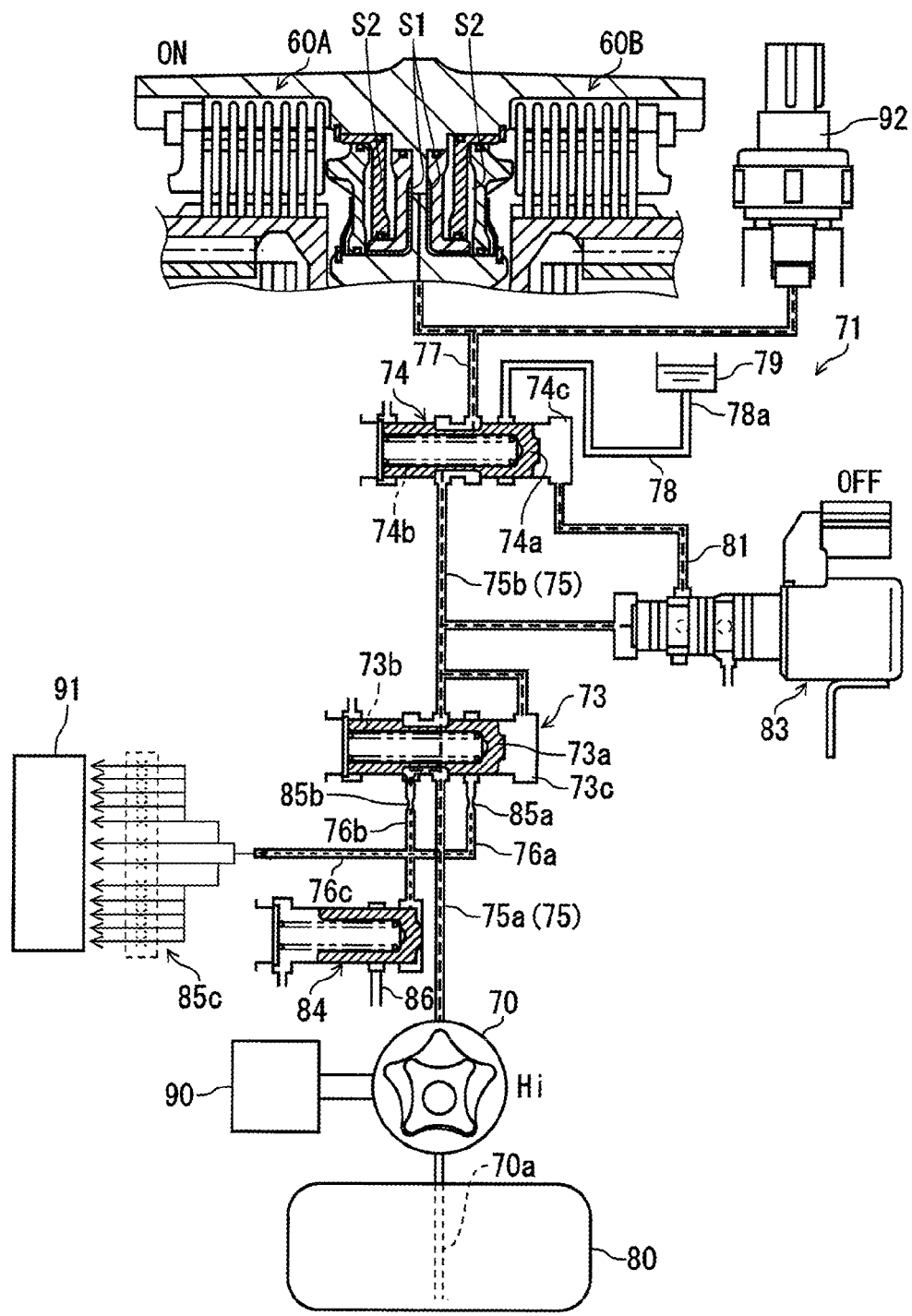
FIG. 10 is a hydraulic circuit diagram of the hydraulic control device when the hydraulic brakes are engaged (EOP: high pressure mode).

FIG. 10 illustrates the hydraulic circuit 71 in a state where the hydraulic brakes 60A and 60B are engaged. In this case, the electric oil pump 70 is operated in the high pressure mode by the control device 8. The control device 8 stops energization to the solenoid 174 of the solenoid valve 83 to apply the hydraulic pressure of the second line oil passage 75b to the oil chamber 74c at the right end of the brake oil passage switching valve 74. Thus, the hydraulic pressure inside the oil chamber 74c exceeds the urging force of the spring 74b, so that the valve body 74a is located at the valve opening position, and the brake oil passage 77 and the high position drain 78 are shut off from each other; in addition, the second line oil passage 75b and the brake oil passage 77 are communicated with each other, and the hydraulic brakes 60A and 60B are engaged.

The hydraulic pressure of the line oil passage 75, applied to the oil chamber 73c at the right end of the low pressure oil passage switching valve 73 in FIG. 10 during operation of the electric oil pump 70 in the high pressure mode, exceeds the urging force of the spring 73b; hence, in the low pressure oil passage switching valve 73, the valve body 73a is located at the high pressure side position, so that the line oil passage 75 is shut off from the first low pressure oil passage 76a and communicated with the second low pressure oil passage 76b. Thus, oil in the line oil passage 75 is reduced in pressure through the orifice 85b via the second low pressure oil passage 76b, and is then supplied to the portions 91 to be lubricated/cooled.

As described above, the control device 8 controls the operation mode (driving state) of the electric oil pump 70 and opening/closing of the solenoid valve 83. Thus, the control device 8 is capable of: disengaging or engaging the hydraulic brakes 60A and 60B; allowing switching between the state in which the electric motors 2A and 2B and the rear wheels Wr are disconnected from each other and the state in which the electric motors 2A and 2B and the rear wheels Wr are connected to each other; and controlling the engagement force for the hydraulic brakes 60A and 60B.

FIG. 11 is a table illustrating relationships between the front wheel driving device 6 and the rear wheel driving device 1 in each vehicle state, together with operating states of the electric motors 2A and 2B and states of the hydraulic circuit 71. In FIG. 11, "FRONT UNIT" represents the front wheel driving device 6, "REAR UNIT" represents the rear wheel driving device 1, "REAR MOTOR" represents the electric motors 2A and 2B, "EOP" represents the electric oil pump 70, "SOL" represents the solenoid 174, "OWC" represents the one-way clutch 50, and "BRK" represents the hydraulic brakes 60A and 60B. FIGS. 12 to 17 illustrate speed collinear diagrams of the rear wheel driving device 1 in the respective states. In each of the diagrams, "S" and "C" on the left side represent the sun gear 21A of the planetary gear type speed reducer 12A connected to the electric motor 2A, and the planetary carrier 23A connected to the axle 10A, respectively, "S" and "C" on the right side represent the sun gear 21B of the planetary gear type speed reducer 12B connected to the electric motor 2B, and the planetary carrier 23B connected to the axle 10B, respectively, "R" represents the ring gears 24A and 24B, "BRK" represents the hydraulic brakes 60A and 60B, and "OWC" represents the one-way clutch 50. In the following description, rotational directions of the sun gears 21A and 21B when the vehicle is moved forward by the electric motors 2A and 2B are each defined as the forward direction. In each of FIGS. 12 to 17, a region above a vehicle stoppage state represents rotation in the forward direction, a region below the vehicle stoppage state represents rotation in the reverse direction, an upward arrow represents a torque in the forward direction, and a downward arrow represents a torque in the reverse direction.

Figure 12:
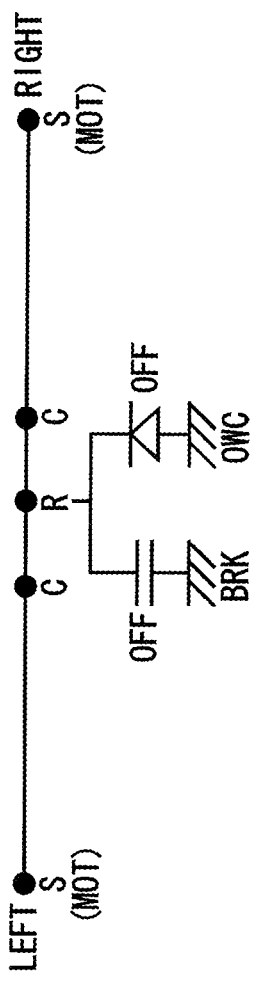
FIG. 12 is a speed collinear diagram of the rear wheel driving device during stoppage of the vehicle.

During stoppage of the vehicle, neither the front wheel driving device 6 nor the rear wheel driving device 1 is driven. Accordingly, as illustrated in FIG. 12, the electric motors 2A and 2B of the rear wheel driving device 1 are stopped, and the axles 10A and 10B are also stopped; hence, no torque is exerted on any of the elements. In the hydraulic circuit 71 during stoppage of the vehicle 3, as illustrated in FIG. 4, the electric oil pump 70 is not driving, and energization to the solenoid 174 of the solenoid valve 83 is stopped; however, since no hydraulic pressure is supplied, the hydraulic brakes 60A and 60B are disengaged (OFF). The one-way clutch 50 is not engaged (OFF) because the electric motors 2A and 2B are not driven.

Figure 13:
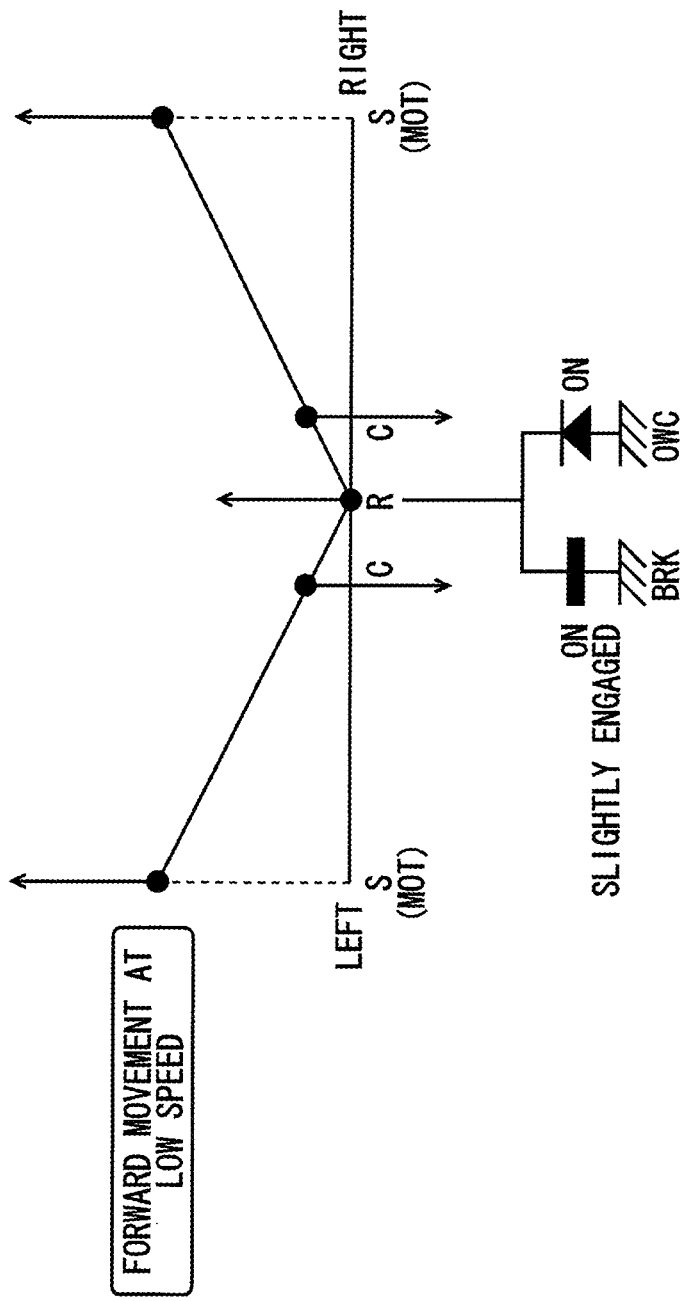
FIG. 13 is a speed collinear diagram of the rear wheel driving device when the vehicle moves forward at a low speed.

Then, after an ignition is turned ON, rear wheel driving is performed by the rear wheel driving device 1 when the vehicle moves forward at a low speed with a high motor efficiency, e.g., in the case of EV starting or EV cruising. As illustrated in FIG. 13, when power driving is performed so that the electric motors 2A and 2B are rotated in the forward direction, a forward torque is applied to the sun gears 21A and 21B. In this case, the one-way clutch 50 is engaged and the ring gears 24A and 24B are locked as mentioned above. Thus, the planetary carriers 23A and 23B are rotated in the forward direction, and the vehicle travels forward. Note that traveling resistance is exerted on the planetary carriers 23A and 23B from the axles 10A and 10B in the reverse direction. As described above, when the vehicle 3 starts to move, the ignition is turned ON, and torques of the electric motors 2A and 2B are increased, thereby mechanically engaging the one-way clutch 50 to lock the ring gears 24A and 24B.

In this case, in the hydraulic circuit 71, the electric oil pump 70 runs in the low pressure mode (Lo), the solenoid 174 of the solenoid valve 83 is not energized (OFF), and the hydraulic brakes 60A and 60B are in the slightly engaged state as illustrated in FIG. 9. As mentioned above, when forward rotational power from the electric motors 2A and 2B is inputted to the rear wheels Wr, the one-way clutch 50 enters the engaged state, and power can be transmitted by the one-way clutch 50 alone. However, the hydraulic brakes 60A and 60B provided in parallel with the one-way clutch 50 are also slightly engaged, and the electric motors 2A and 2B and the rear wheels Wr are brought to the connected state; thus, even when the forward rotational power inputted to the rear wheels Wr from the electric motors 2A and 2B is temporarily reduced and the one-way clutch 50 enters the disengaged state, power transmission between the electric motors 2A and 2B and the rear wheels Wr can be prevented from being disabled. When a shift is made to deceleration regeneration which will be described later, rotational frequency control for bringing the electric motors 2A and 2B and the rear wheels Wr to the connected state is unnecessary.

Figure 14:
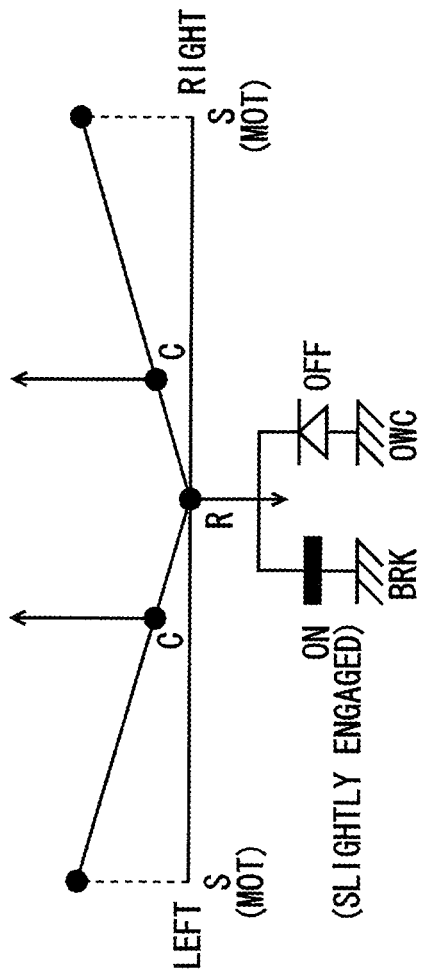
FIG. 14 is a speed collinear diagram of the rear wheel driving device when the vehicle moves forward at an intermediate speed.

When the vehicle speed is increased and a shift is made from low speed forward traveling to intermediate speed forward traveling in which engine efficiency is high, a driving mode is changed from rear wheel driving performed by the rear wheel driving device 1 to front wheel driving performed by the front wheel driving device 6. As illustrated in FIG. 14, when power driving of the electric motors 2A and 2B is stopped, a forward torque, which will cause the vehicle to travel forward, is exerted on the planetary carriers 23A and 23B from the axles 10A and 10B, and therefore, the one-way clutch 50 enters the disengaged state as mentioned above.

In this case, in the hydraulic circuit 71, the electric oil pump 70 runs in the low pressure mode (Lo), the solenoid 174 of the solenoid valve 83 is not energized (OFF), and the hydraulic brakes 60A and 60B are in the slightly engaged state as illustrated in FIG. 9.

Figure 15:
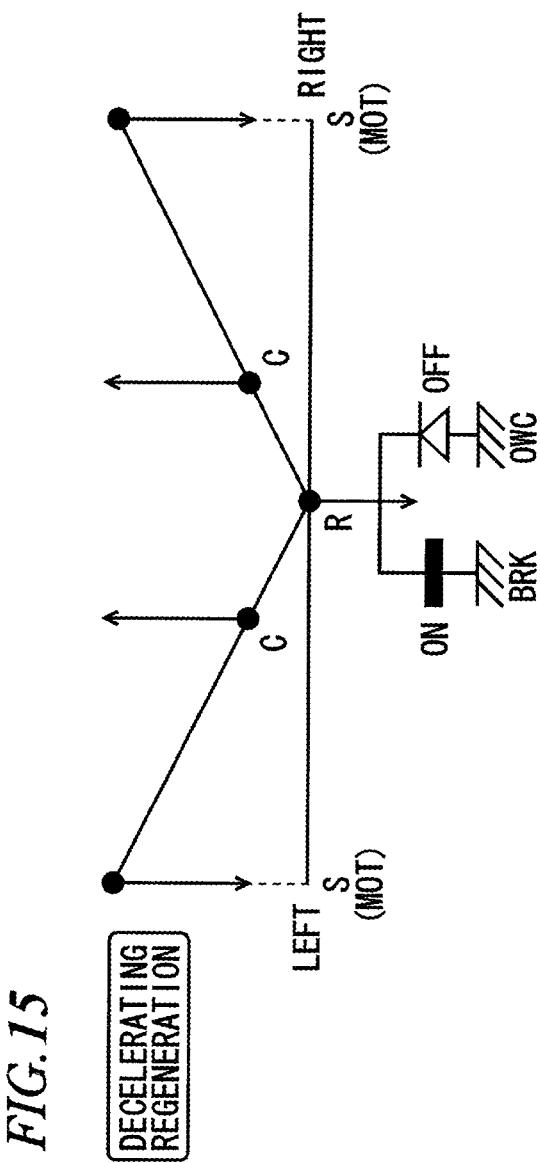
FIG. 15 is a speed collinear diagram of the rear wheel driving device when the vehicle is reduced in speed and regeneration is carried out.

As illustrated in FIG. 15, when an attempt is made to perform regeneration driving of the electric motors 2A and 2B from the state illustrated in FIG. 13 or 14, a forward torque, which will cause the vehicle to continue traveling forward, is exerted on the planetary carriers 23A and 23B from the axles 10A and 10B, and therefore, the one-way clutch 50 enters the disengaged state as mentioned above.

In this case, in the hydraulic circuit 71, the electric oil pump 70 runs in the high pressure mode (Hi), the solenoid 174 of the solenoid valve 83 is not energized (OFF), and the hydraulic brakes 60A and 60B are in the engaged state (ON) as illustrated in FIG. 10. Accordingly, the ring gears 24A and 24B are fixed, and a regeneration braking torque is exerted on the electric motors 2A and 2B in the reverse direction, thereby performing deceleration regeneration by the electric motors 2A and 2B. As mentioned above, when forward rotational power from the rear wheels Wr is inputted to the electric motors 2A and 2B, the one-way clutch 50 enters the disengaged state, and thus power transmission cannot be performed by means of the one-way clutch 50 alone. However, the hydraulic brakes 60A and 60B provided in parallel with the one-way clutch 50 are engaged, and the electric motors 2A and 2B and the rear wheels Wr are put in the connected state, thereby allowing the electric motors 2A and 2B and the rear wheels Wr to be maintained in the power transmittable state. In this state, the electric motors 2A and 2B are controlled so as to be brought to a regeneration driving state, thereby enabling regeneration of energy of the vehicle 3.

Subsequently, at the time of acceleration, four-wheel driving is performed by the front wheel driving device 6 and the rear wheel driving device 1. The rear wheel driving device 1 in this case is in the same state as the rear wheel driving device 1 at the time of low speed forward movement illustrated in FIG. 13, and the hydraulic circuit 71 is also in the state illustrated in FIG. 9.

Figure 16:
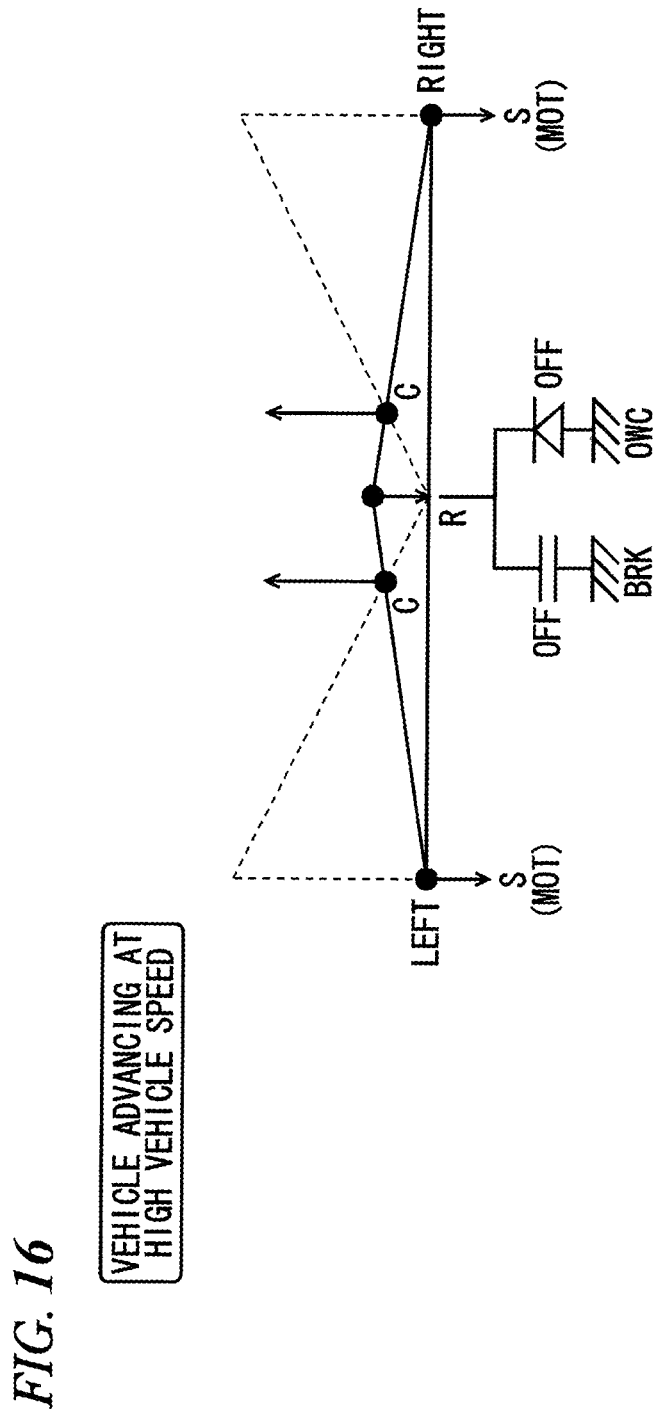
FIG. 16 is a speed collinear diagram of the rear wheel driving device when the vehicle moves forward at a high speed.

At the time of high speed forward movement, front wheel driving is performed by the front wheel driving device 6. As illustrated in FIG. 16, when power driving of the electric motors 2A and 2B is stopped, a forward torque, which will cause the vehicle to travel forward, is exerted on the planetary carriers 23A and 23B from the axles 10A and 10B, and therefore, the one-way clutch 50 enters the disengaged state as mentioned above.

In this case, in the hydraulic circuit 71, the electric oil pump 70 runs in the low pressure mode (Lo), the solenoid 174 of the solenoid valve 83 is energized (ON), and the hydraulic brakes 60A and 60B are in the disengaged state (OFF) as illustrated in FIG. 8. Accordingly, drag of the electric motors 2A and 2B is prevented, and the electric motors 2A and 2B are prevented from being excessively rotated at the time of high speed movement by the front wheel driving device 6.

Figure 17:
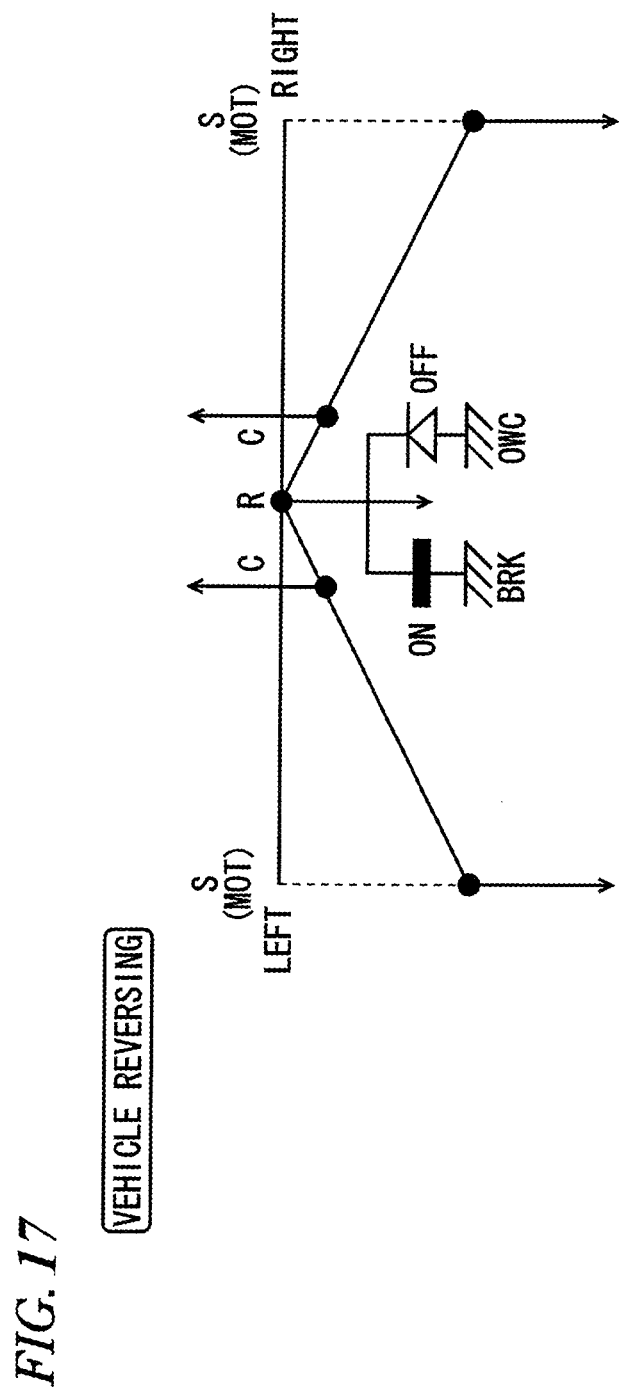
FIG. 17 is a speed collinear diagram of the rear wheel driving device when the vehicle moves backward.

At the time of backward movement, as illustrated in FIG. 17, a reverse torque is applied to the sun gears 21A and 21B upon reverse power driving of the motors 2A and 2B. In this case, the one-way clutch 50 enters the disengaged state as mentioned above.

In this case, in the hydraulic circuit 71, the electric oil pump 70 runs in the high pressure mode (Hi), the solenoid 174 of the solenoid valve 83 is not energized (OFF), and the hydraulic brakes 60A and 60B are in the engaged state as illustrated in FIG. 10. Accordingly, the ring gears 24A and 24B are fixed, and the planetary carriers 23A and 23B are rotated in the reverse direction to cause the vehicle to travel backward. Note that traveling resistance is exerted on the planetary carriers 23A and 23B from the axles 10A and 10B in the forward direction. As mentioned above, when reverse rotational power from the electric motors 2A and 2B is inputted to the rear wheels Wr, the one-way clutch 50 enters the disengaged state, and thus power transmission cannot be performed by means of the one-way clutch 50 alone. However, the hydraulic brakes 60A and 60B provided in parallel with the one-way clutch 50 are engaged, and the electric motors 2A and 2B and the rear wheels Wr are put in the connected state; thus, the electric motors 2A and 2B and the rear wheels Wr can be maintained in the power transmittable state, and the vehicle 3 can be moved backward by the rotational power of the electric motors 2A and 2B.

As described above, in the rear wheel driving device 1, the engagement and disengagement of hydraulic brakes 60A and 60B are controlled in accordance with the traveling state of the vehicle 3, i.e., in accordance with whether the rotational direction of the electric motors 2A and 2B is the forward direction or reverse direction and whether power is inputted from the electric motors 2A and 2B or the rear wheels Wr; furthermore, even when the hydraulic brakes 60A and 60B are engaged, the engagement force is adjusted.

Figure 18B:
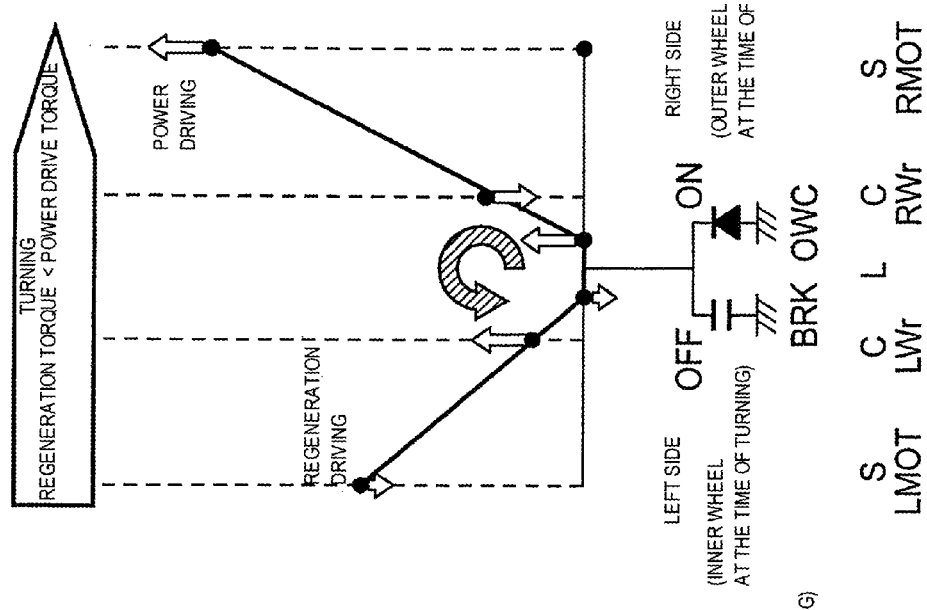
FIG. 18B is a speed collinear diagram of the rear wheel driving device when the vehicle is making a turn and power driving force is greater than regeneration driving force.
Figure 18A:
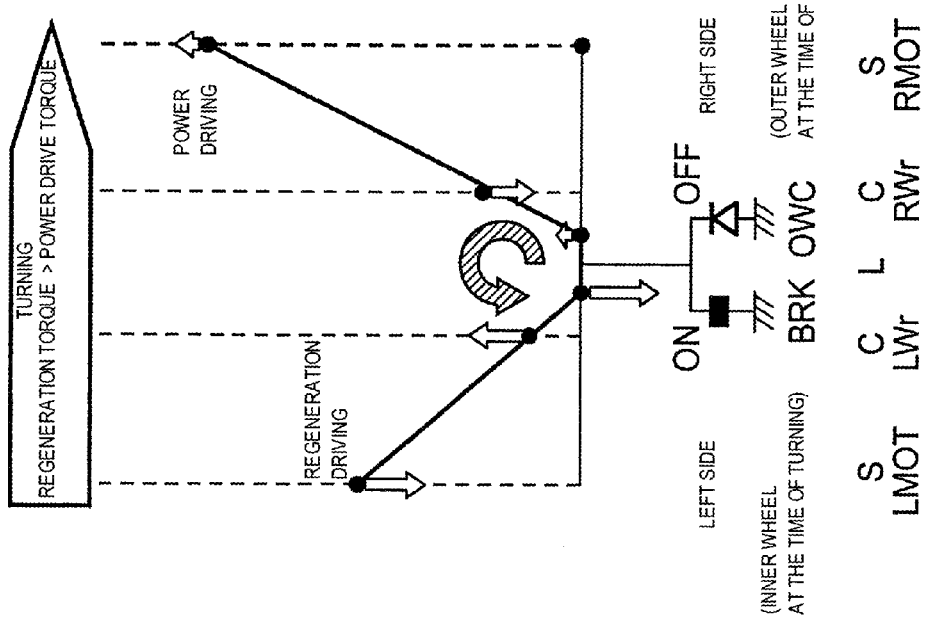
FIG. 18A is a speed collinear diagram of the rear wheel driving device when the vehicle is making a turn and regeneration driving force is greater than power driving force.

The above description has been made on the assumption that the vehicle travels straight, i.e., on the assumption that there is no rotation difference between the right and left electric motors 2A and 2B. Next, the following description will be made on the assumption that the vehicle 3 makes a turn. Referring to FIGS. 18A and 18B, control performed when the vehicle 3 makes a turn during vehicle traveling will be described by way of example on the assumption that the vehicle 3 makes a left turn, i.e., on the assumption that there is a rotation difference between the right and left electric motors 2A and 2B, the left rear wheel LWr connected to the electric motor 2A is an inner wheel during the turning of the vehicle, and the right rear wheel RWr connected to the electric motor 2B is an outer wheel during the turning of the vehicle.

FIG. 18A is a speed collinear diagram obtained when a regeneration torque of the left rear wheel LWr is greater than a power drive torque of the right rear wheel RWr. When an absolute value of a regeneration torque of the electric motor 2A is greater than an absolute value of a power drive torque of the electric motor 2B, the one-way clutch 50 enters the disengaged state; therefore, in the state of FIG. 18A, the hydraulic brakes 60A and 60B are engaged. Although not illustrated, also when the regeneration torque of the left rear wheel LWr and the power drive torque of the right rear wheel RWr are equal to each other, the hydraulic brakes 60A and 60B are engaged in order to ensure power transmission.

FIG. 18B is a speed collinear diagram obtained when the regeneration torque of the left rear wheel LWr is smaller than the power drive torque of the right rear wheel RWr. When the absolute value of the regeneration torque of the electric motor 2A is smaller than the absolute value of the power drive torque of the electric motor 2B, the one-way clutch 50 enters the engaged state; therefore, in the state of FIG. 18B, the hydraulic brakes 60A and 60B are disengaged.

As described above, when the vehicle makes a turn, reliable power transmission is ensured by controlling engagement and disengagement of the hydraulic brakes 60A and 60B based on a difference between the absolute values of torques of the electric motors 2A and 2B. Normally, power driving/regeneration states of the right and left rear wheels LWr and RWr and magnitudes of torques obtained in this case are controlled based on: a sum of right and left rear wheel torques (which may hereinafter be referred to as a "first relationship"), i.e., a torque requirement in a front-rear direction; and a difference between the right and left rear wheel torques (which may hereinafter be referred to as a "second relationship"), i.e., a torque requirement in a turning direction. Such control will hereinafter be referred to as "torque-prioritized control". The state of FIG. 18A indicates control performed when there is a deceleration requirement for the rear wheels Wr during the turning, and the state of FIG. 18B indicates control performed when there is an acceleration requirement for the rear wheels Wr during the turning. In both cases, a counterclockwise yawing moment is produced.

The torque-prioritized control will be described using mathematical expressions. The following expressions (1) and (2) are established from the first and second relationships, respectively, where TT1 denotes a target torque for the left rear wheel LWr, TT2 denotes a target torque for the right rear wheel RWr, TRT denotes a total target torque for the right and left rear wheels LWr and RWr (i.e., a sum of right and left rear wheel torques), and ΔTT denotes a target torque difference between the right and left rear wheels LWr and RWr (i.e., a difference between right and left rear wheel torques).

$$TT1+TT2=TRT \quad (1)$$

$$TT1-TT2=\Delta TT \quad (2)$$

Note that ΔTT is represented by the following expression (3) where YMT denotes a target yawing moment (which is positive when it is clockwise), r denotes a wheel radius, and Tr denotes a tread width (i.e., a distance between the right and left rear wheels LWr and RWr):

$$\Delta TT=2 \cdot r \cdot YMT/Tr \quad (3)$$

Accordingly, the target torques TT1 and TT2 for the right and left rear wheels LWr and RWr are determined uniquely from the expressions (1) and (2), respectively.

When TM1 denotes a target torque for the electric motor 2A connected to the left rear wheel LWr and TM2 denotes a target torque for the electric motor 2B connected to the right rear wheel RWr, the target torques TM1 and TM2 for the right and left electric motors 2A and 2B are derived from the following expressions (4) and (5). Note that Ratio denotes a gear ratio.

$$TM1=(1/\text{Ratio}) \cdot TT1 \quad (4)$$

$$TM2=(1/\text{Ratio}) \cdot TT2 \quad (5)$$

As described above, in the torque-prioritized control, the torque requirement in the front-rear direction and the torque requirement in the turning direction can be satisfied from the first and second relationships, and importance is placed on traveling performance of the vehicle.

In the present invention, the electric motors 2A and 2B are controlled selectively in the torque-prioritized control, and electric power-prioritized control which will be described later.

In the electric power-prioritized control, priority is given to a sum of electric power generated or consumed by the electric motor 2A and electric power generated or consumed by the electric motor 2B (which may hereinafter be referred to as a "third relationship"), and both of the electric motors 2A and 2B are controlled based on the sum of the electric power. More specifically, both of the electric motors 2A and 2B are controlled based on at least either the first or second relationship and the third relationship so that the third relationship is satisfied on a first priority basis. The following description will be made based on an example where the control is performed using a sum of right and left rear wheel torques as the first relationship and a difference between right and left rear wheel torques as the second relationship.

The electric power-prioritized control is selected in accordance with, for instance, a state of the battery 9 and/or a state of the electric motor 5 of the front wheel driving device 6. For example, the electric power-prioritized control is performed in the event of trouble in normal supply and reception of electric power, e.g., when the temperature of the battery 9 is equal to or lower than a given temperature, i.e., at a "low temperature", when the amount of electric power remaining in the battery 9 is small, when the amount of electric power generated by the electric motor 5 of the front wheel driving device 6 is insufficient or the electric motor 5 is in a power driving state, and/or when a failure in the battery 9 or the electric motor 5 is detected.

The electric power-prioritized control will be described using mathematical expressions below (on the assumption that a sum of electric power is zero). In the electric power-prioritized control, in addition to the expressions (1) and (2), the following expression (6) is derived from the third relationship, where P1 denotes electric power of the electric motor 2A, and P2 denotes electric power of the electric motor 2B:

$$P1+P2=0 \qquad (6)$$

In this case, since a loss occurs in supply and reception of electric power, regeneration electric power and power driving electric power can be represented by the following expressions (7) and (8), respectively:

REGENERATION ELECTRIC
POWER=MECHANICAL INPUT(1−REGENERATION LOSS FACTOR) (7)

POWER DRIVING ELECTRIC
POWER=MECHANICAL INPUT(1+POWER DRIVING LOSS FACTOR) (8)

Assuming that regeneration driving of the electric motor 2A and power driving of the electric motor 2B are carried out as illustrated in FIGS. 18A and 18B, P1 and P2 can be represented by the following expressions (9) and (10) based on the expressions (7) and (8), where ω1 denotes an angular velocity of the electric motor 2A, ω2 denotes an angular velocity of the electric motor 2B, Lr1 denotes a regeneration loss factor, and Lr2 denotes a power driving loss factor:

$$P1=\omega 1 \cdot TM1(1-Lr1) \qquad (9)$$

$$P2=\omega 2 \cdot TM2(1+Lr2) \qquad (10)$$

Note that $\omega=2\cdot\pi\cdot n/60$ (where n denotes a rotational frequency of the electric motor).

Upon deletion of TM1 and TM2 from the expressions (4) to (6), (9) and (10), the following expression (11) is derived from the third relationship:

$$TT2=-(\omega 1/\omega 2) \cdot \{(1-Lr1)/(1+Lr2)\} \cdot TT1 \qquad (11)$$

In the electric power-prioritized control, the electric motors 2A and 2B are controlled based on: either the expression (1) derived from the first relationship or the expression (2) derived from the second relationship; and the expression (11) derived from the third relationship. In other words, in the electric power-prioritized control, the expression (11) derived from the third relationship is placed at the first priority.

A study of the expression (11) indicates that the angular velocity ω1 of the electric motor 2A for the inner wheel is smaller than the angular velocity ω2 of the electric motor 2B for the outer wheel (ω1<ω2), and there is obtained the following expression: (1−Lr1)<(1+Lr2). Thus, there are inevitably obtained the following expressions: |TT2|<|TT1|, and TT1+TT2<0. Accordingly, in the electric power-prioritized control, the total target torque TRT for the right and left rear wheels LWr and RWr (i.e., a sum of right and left rear wheel torques) will surely be negative, which means that a regeneration torque will be greater than a power drive torque.

The above description has been made based on the example where the control is performed using, as parameters, a sum of right and left rear wheel torques as the first relationship and a difference between right and left rear wheel torques as the second relationship. Alternatively, a left rear wheel driving force and a right rear wheel driving force may be used as parameters. In that case, conversion of a wheel torque T(N·m) and a wheel driving force F(N) is performed by the following expression (12) where r denotes a radius of the rear wheel Wr:

$$F=T/r \qquad (12)$$

Instead of a wheel torque and a wheel driving force, an electric motor torque and an electric motor driving force may be used. Conversion of an electric motor torque T(N·m) and an electric motor driving force F(N) is performed similarly by the expression (12).

A wheel torque and an electric motor torque can be converted to each other as described with reference to the expressions (4) and (5), and a torque and a driving force can be converted to each other as described with reference to the expression (12). Therefore, instead of a sum of right and left rear wheel torques, any one of a sum of electric motor torques of the electric motors 2A and 2B, a sum of right and left rear wheel driving forces, and a sum of electric motor driving forces of the electric motors 2A and 2B may be determined as the first relationship.

Similarly, instead of a difference between right and left rear wheel torques, any one of a difference between electric motor torques of the electric motors 2A and 2B, a difference between right and left rear wheel driving forces, and a difference between electric motor driving forces of the electric motors 2A and 2B may be determined as the second relationship.

Figure 19B:
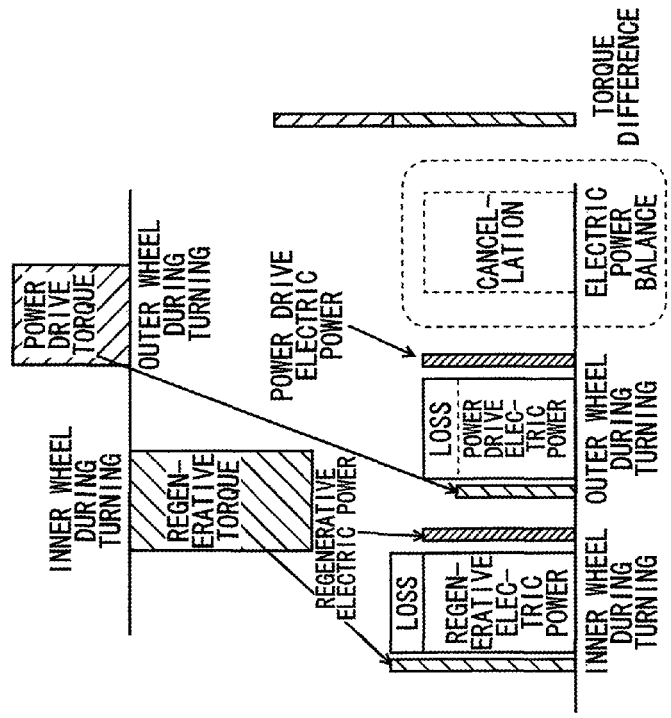
FIG. 19B is an explanatory diagram of a balance of electric power when the vehicle makes a turn and electric power-prioritized control is performed.
Figure 19A:
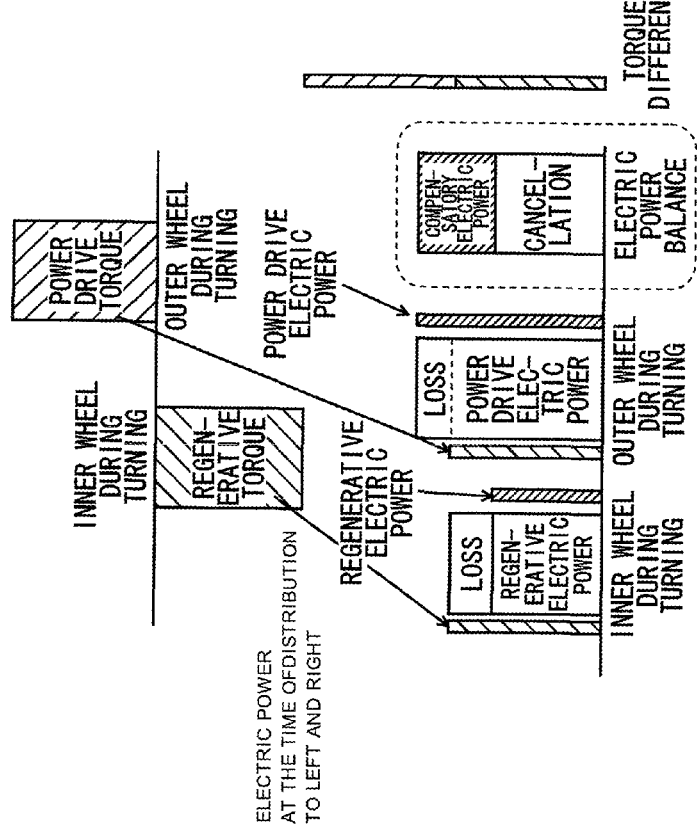
FIG. 19A is an explanatory diagram of a balance of electric power when the vehicle makes a turn and torque-prioritized control is performed.

Next, differences between a balance of electric power in the torque-prioritized control and a balance of electric power in the electric power-prioritized control will be described with reference to FIGS. 19A and 19B. FIG. 19A is a diagram illustrating a balance of electric power in the torque-prioritized control, and FIG. 19B is a diagram illustrating a balance of electric power in the electric power-prioritized control.

Referring to FIG. 19A, by way of example of the torque-prioritized control, torques of the electric motors 2A and 2B are decided based on a sum of right and left rear wheel torques (i.e., the first relationship) and a difference between right and left rear wheel torques (i.e., the second relationship), so that the sum of right and left rear wheel torques is zero, i.e., TT1+TT2=TRT=0 (expression (1)), and the difference between right and left rear wheel torques is a given value other than zero, i.e., TT1−TT2=ΔTT≠0 (expression (2)).

In this state, the sum of the left rear wheel torque (regeneration torque) and right rear wheel torque (power drive torque) is zero, and thus a torque balance is achieved; in addition, there is a difference between the left rear wheel torque (regeneration torque) and right rear wheel torque (power drive torque), so that no acceleration or deceleration is performed by the rear wheel driving device 1 in the front-rear direction and a counterclockwise yawing moment is produced.

Regeneration driving of the electric motor 2A generates regeneration electric power which is obtained by subtracting electric power corresponding to a regeneration loss from electric power equivalent to the regeneration torque. In order to allow the right rear wheel RWr to generate the power drive torque equal to the regeneration torque of the left rear wheel LWr, there is a need for power driving electric power which is obtained by adding electric power corresponding to a power driving loss to electric power corresponding to the power drive torque. With regard to an electric power balance in this case, the regeneration electric power of the electric motor 2A is used for the power driving electric power of the electric motor 2B and offset, and the remaining electric power (compensating electric power) obtained by subtracting the regeneration electric power of the electric motor 2A from the power driving electric power of the electric motor 2B is supplied from the battery 9 or the electric motor 5 of the front wheel driving device 6.

Accordingly, in the torque-prioritized control illustrated in FIG. 19A, the vehicle 3 is controlled so as to satisfy the torque requirements in the front-rear direction and in the turning direction while receiving electric power from a power source other than the electric motors 2A and 2B.

Referring to FIG. 19B, by way of example of the electric power-prioritized control, torques of the electric motors 2A and 2B are decided based on a sum of electric power of the electric motor 2A and electric power of the electric motor 2B (i.e., the third relationship) and a difference between right and left rear wheel torques (i.e., the second relationship), so that the sum of electric power of the electric motor 2A and electric power of the electric motor 2B is zero, i.e., P1+P2=0 (expression (3)), and the difference between right and left rear wheel torques is a given value other than zero, i.e., TT1−TT2=ΔTT≠0 (expression (2)).

In this state, the sum of the left rear wheel torque (regeneration torque) and right rear wheel torque (power drive torque) is negative; in addition, the difference between the left rear wheel torque (regeneration torque) and right rear wheel torque (power drive torque) is greater than zero, so that deceleration is performed by the rear wheel driving device 1 in the front-rear direction and a counterclockwise yawing moment is produced. Note that the difference between the left rear wheel torque (regeneration torque) and right rear wheel torque (power drive torque) in this case is equal to the difference between the left rear wheel torque (regeneration torque) and right rear wheel torque (power drive torque) in FIG. 19A, and therefore, the yawing moment equal to that in FIG. 19A is produced.

Regeneration driving of the electric motor 2A generates regeneration electric power which is obtained by subtracting electric power corresponding to a regeneration loss from electric power equivalent to the regeneration torque. Power driving of the electric motor 2B is performed by using the regeneration electric power generated by the electric motor 2A, and there is produced the power drive torque corresponding to electric power obtained by subtracting electric power corresponding to a power driving loss from the regeneration electric power generated by the electric motor 2A. With regard to an electric power balance in this case, the regeneration electric power generated by the electric motor 2A and power driving electric power consumed by the electric motor 2B are in balance, and no electric power is supplied and received between the battery 9 or the electric motor 5 of the front wheel driving device 6 and the electric motors 2A and 2B.

Accordingly, in the electric power-prioritized control illustrated in FIG. 19B, the vehicle is controlled so as to satisfy the torque requirement in the turning direction without causing supply of electric power from a power source other than the electric motors 2A and 2B and supply of electric power thereto.

In the above-described embodiment, the vehicle is controlled so as to satisfy the second relationship, i.e., the difference between right and left rear wheel torques, on a second priority basis; thus, the torque requirement in the turning direction can be satisfied while the requirement for electric power is satisfied, resulting in enhancement of turning performance. When such control is performed at the time of acceleration of the vehicle 3, priority is given to the torque requirement in the turning direction rather than to the torque requirement in the front-rear direction at the time of acceleration, and therefore, acceleration is enabled while turning performance is enhanced. Note that the vehicle may be controlled so as to satisfy the first relationship, i.e., the sum of right and left rear wheel torques, on a second priority basis, instead of the second relationship, i.e., the difference between right and left rear wheel torques. In that case, the torque requirement in the front-rear direction can be satisfied while the requirement for electric power is satisfied, resulting in enhancement of stability. When such control is performed at the time of deceleration of the vehicle 3, priority is given to the torque requirement in the front-rear direction rather than to the torque requirement in the turning direction at the time of deceleration, and therefore, deceleration can be performed with stability.

In the above-described embodiment, the regeneration loss factor Lr1 and the power driving loss factor Lr2 are used in the expressions (9) to (11), but the present invention is not limited to this example. Alternatively, a loss itself may be used. In that case, the expressions (9) to (11) are replaced with the following expressions (9)' to (11)' where L1 denotes a regeneration loss and L2 denotes a power driving loss:

$$P1 = \omega1 \cdot TM1 \cdot L1 \quad (9)'$$

$$P2 = \omega2 \cdot TM2 + L2 \quad (10)'$$

$$TT2 = -\{(\omega1/\omega2) \cdot TT1 + \text{Ratio} \cdot (L1-L2)\}/\omega2 \quad (11)'$$

In the above-described embodiment, the electric power-prioritized control has been described based on the example where the sum of electric power of the electric motor 2A and electric power of the electric motor 2B is zero, i.e., P1+P2=0, but the present invention is not limited to this example. Alternatively, the vehicle may be controlled so as to allow the sum of electric power of the electric motor 2A and electric power of the electric motor 2B to reach given target electric power, i.e., so as to satisfy the following relationship: P1+P2=GIVEN TARGET ELECTRIC POWER (≠0). Thus, a balance of electric power between the electric motors 2A and 2B can allow the given target electric power to be reached, thereby making it possible to cope with a situation where the battery 9 or the electric motor 5 is out of order.

As described thus far, according to the present embodiment, the electric power requirement can be satisfied by performing the electric power-prioritized control for controlling the electric motors 2A and 2B so that the third relationship, including the sum of electric power generated or consumed by the electric motor 2A and electric power generated or consumed by the electric motor 2B, is satisfied on a first priority basis; thus, the possibility of an excess or deficiency of electric power and damage to an electrical system can be reduced.

Since the battery 9 and the electric motor 5 of the front wheel driving device 6 are provided as power sources, the electric power-prioritized control is performed in accordance with states of the battery 9 and the electric motor 5, thus making it possible to avoid performing the electric power-prioritized control when it is unnecessary. Note that both of the battery 9 and the electric motor 5 do not necessarily have to be provided as power sources, but only one of them may be provided. For example, when the battery 9 is provided, the electric power-prioritized control is performed in accordance with the state of the battery 9, thus making it possible to drive the electric motors 2A and 2B suitably for the battery 9. When the battery 9 is provided and assuming that generation of electric power is positive and a storage state of the battery 9 is equal to or lower than a given level, the control is performed so that the sum of electric power of the electric motor 2A and electric power of the electric motor 2B becomes zero or more, thus allowing electric power to be stored in the battery 9 without being consumed by the battery 9. On the other hand, when the storage state of the battery 9 is equal to or higher than the given level, the control is performed so that the sum of electric power of the electric motor 2A and electric power of the electric motor 2B becomes zero or less, thus allowing electric power to be consumed by the battery 9 without being stored in the battery 9, and making it possible to prevent an overcharged state thereof. Alternatively, the electric power-prioritized control may be performed in accordance with allowable input and output of the battery 9 so that the sum of electric power of the electric motor 2A and electric power of the electric motor 2B falls within a range of the allowable input and output. Thus, electric power can be supplied and received within the range of the allowable input and output of the battery 9. When the temperature of the battery 9 is equal to or lower than a given temperature, the control is performed so that the sum of electric power of the electric motor 2A and electric power of the electric motor 2B becomes zero, thus making it possible to prevent outflow and inflow of electric power from and into the battery 9 when the temperature thereof is low, and to drive the electric motors 2A and 2B even when the battery 9 is at a low temperature. Moreover, when a failure in the battery 9 is detected, the control is performed so that the sum of electric power of the electric motor 2A and electric power of the electric motor 2B becomes zero, thus making it possible to prevent outflow and inflow of electric power from and into the battery 9 at the time of a failure in the battery 9, and to drive the electric motors 2A and 2B even at the time of a failure in the battery 9.

When the electric motor 5 of the front wheel driving device 6 is provided instead of the battery 9 or together with the battery 9, the electric power-prioritized control is performed in accordance with the state of the electric motor 5, thus driving the electric motors 2A and 2B suitably for the electric motor 5; in addition, electric power is supplied from and received by the electric motor 5, thus making it possible to improve energy efficiency. When an electric power generation state of the electric motor 5 is equal to or lower than a given level and assuming that generation of electric power is positive, the control is performed so that the sum of electric power of the electric motor 2A and electric power of the electric motor 2B becomes zero or more, thus making it possible to avoid a deficiency of electric power. Alternatively, the electric power-prioritized control may be performed in accordance with an allowable electric power generation output of the electric motor 5 so that the sum of electric power of the electric motor 2A and electric power of the electric motor 2B falls within a range of the allowable electric power generation output. Thus, electric power can be received within the range of the allowable electric power generation output of the electric motor 5. When a failure in the electric motor 5 is detected or the electric motor 5 is in a power driving state and assuming that generation of electric power is positive, the control is performed so that the sum of electric power of the electric motor 2A and electric power of the electric motor 2B becomes zero or more, thus making it possible to drive the electric motors 2A and 2B even at the time of a failure in the electric motor 5 or when the electric motor 5 is in the power driving state.

The electric power-prioritized control is performed so that the sum of electric power of the electric motor 2A and electric power of the electric motor 2B becomes zero, and thus a balance of electric power between the electric motors 2A and 2B is achieved; therefore, no electric power is supplied from the battery 9 and/or the electric motor 5, and no electric power is supplied thereto, thus making it possible to drive the electric motors 2A and 2B irrespective of condition(s) of the battery 9 and/or the electric motor 5.

According to the present embodiment, the rear wheel driving device 1 disengages the hydraulic brakes 60A and 60B, thereby making it possible to allow or interrupt power transmission between the electric motors 2A and 2B and the rear wheels Wr. The one-way clutch 50 is provided in parallel with the hydraulic brakes 60A and 60B; therefore, for example, when forward rotational power from the electric motors 2A and 2B is inputted to the rear wheels Wr to bring the one-way clutch 50 to the engaged state, power transmission is enabled by the one-way clutch 50, thus making it possible to disengage the hydraulic brakes 60A and 60B or reduce the engagement force thereof. Assuming that generation of electric power is positive and when the sum of electric power of the electric motor 2A and electric power of the electric motor 2B is zero or more, the regeneration torque is inevitably greater due to an electricity loss, and therefore, torque transmission between the electric motors 2A and 2B and the rear wheels Wr is reliably enabled by engaging the hydraulic brakes 60A and 60B. On the other hand, when the sum of electric power of the electric motor 2A and electric power of the electric motor 2B is lower than a given value which is zero or less, and the power drive torque is greater, torque transmission between the electric motors 2A and 2B and the rear wheels Wr is enabled even when the hydraulic brakes 60A and 60B are disengaged.

Note that the present invention is not limited to the above-described embodiment, and changes, modifications, etc. may be made as appropriate.

Although the above description has been made based on the example where the vehicle driving device according to the present invention is used as the rear wheel driving device, the vehicle driving device according to the present invention may be used as the front wheel driving device.

The right and left wheels may each be connected to the associated motor generator, and the planetary gear type speed reducers 12A and 12B do not necessarily have to be provided. The right and left wheels may each be connected to the associated motor generator directly.

The front wheel driving device may use the electric motor as a sole driving source without using the internal combustion engine.

Note that the present application is based on Japanese Patent Application No. 2011-148489 filed on Jul. 4, 2011, the contents of which are hereby incorporated by reference.

DESCRIPTION OF REFERENCE CHARACTERS 1 rear wheel driving device (vehicle driving device)
2A electric motor (left motor generator)
2B electric motor (right motor generator)
5 electric motor (power source, another motor generator)
6 front wheel driving device
8 control device
9 battery (power source)
12A planetary gear type speed reducer (left speed changer)
12B planetary gear type speed reducer (right speed changer)
21A, 21B sun gear
23A, 23B planetary carrier
24A, 24B ring gear
50 one-way clutch (one-way power transmission device)
60A, 60B hydraulic brake (connection/disconnection means)
LWr left rear wheel (left wheel)
RWr right rear wheel (right wheel)

The invention claimed is:

1. A vehicle driving device comprising:
a left motor generator connected to a left wheel of a vehicle;
a right motor generator connected to a right wheel of the vehicle; and
a control device for controlling the right and left motor generators,
wherein the control device performs an electric power-prioritized control for controlling the right and left motor generators such that a third relationship is satisfied as the first priority based on at least either a first relationship or a second relationship and the third relationship,
wherein the first relationship is defined as including a sum of right and left wheel torques, a sum of right and left motor generator torques, a sum of right and left wheel driving forces, or a sum of right and left motor generator driving forces,
wherein the second relationship is defined as including a difference between right and left wheel torques, a difference between right and left motor generator torques, a difference between right and left wheel driving forces, or a difference between right and left motor generator driving forces, and
wherein the third relationship is defined as including a sum of a left electric power which is generated or consumed by the left motor generator and a right electric power which is generated or consumed by the right motor generator.

2. The vehicle driving device of claim 1, further comprising:
a power source electrically connected to the right and left motor generators, and
wherein the electric power-prioritized control is performed in accordance with a state of the power source.

3. The vehicle driving device of claim 2,
wherein the power source is a battery, and
wherein the electric power-prioritized control is performed in accordance with a state of the battery.

4. The vehicle driving device of claim 3,
wherein when a storage state of the battery is equal to or lower than a given level, the electric power-prioritized control is performed such that the sum of the left electric power and the right electric power in the third relationship becomes zero or more, where generation of electric power is defined as a positive value.

5. The vehicle driving device of claim 3,
wherein when a storage state of the battery is equal to or higher than a given level, the electric power-prioritized control is performed such that the sum of the left electric power and the right electric power in the third relationship becomes zero or less, where generation of electric power is defined as a positive value.

6. The vehicle driving device of claim 3,
wherein the electric power-prioritized control is performed in accordance with allowable input and output of the battery such that the sum of the left electric power and the right electric power in the third relationship falls within a range of the allowable input and output.

7. The vehicle driving device of claim 3,
wherein when a temperature of the battery is equal to or lower than a given temperature, the electric power-prioritized control is performed such that the sum of the left electric power and the right electric power in the third relationship becomes zero.

8. The vehicle driving device of claim 3,
wherein when a failure in the battery is detected, the electric power-prioritized control is performed such that the sum of the left electric power and the right electric power in the third relationship becomes zero.

9. The vehicle driving device of claim 2,
wherein the power source is another motor generator different from the right and left motor generators, and the electric power-prioritized control is performed in accordance with a state of the another motor generator.

10. The vehicle driving device of claim 9,
wherein when an electric power generation state of the another motor generator is equal to or lower than a given level, the electric power-prioritized control is performed such that the sum of the left electric power and the right electric power in the third relationship becomes zero or more, where generation of electric power is defined as a positive value.

11. The vehicle driving device of claim 9,
wherein the electric power-prioritized control is performed in accordance with an allowable electric power generation output of the another motor generator such that the sum of the left electric power and the right electric power in the third relationship falls within a range of the allowable electric power generation output.

12. The vehicle driving device of claim 9,
wherein when a failure in the another motor generator is detected or the another motor generator is in a power driving state, the electric power-prioritized control is performed such that the sum of the left electric power and the right electric power in the third relationship becomes zero or more, where generation of electric power is defined as a positive value.

13. The vehicle driving device of claim 1,
wherein the electric power-prioritized control is performed such that the sum of the left electric power and the right electric power in the third relationship becomes zero.

14. The vehicle driving device of claim 1,
wherein the electric power-prioritized control is performed such that the sum of the left electric power and the right electric power in the third relationship reaches a given target electric power.

15. The vehicle driving device of claim 1,
wherein in the electric power-prioritized control, the right and left motor generators are controlled such that the first relationship is satisfied as the second priority.

16. The vehicle driving device of claim 15,
wherein at the time of deceleration of the vehicle, the control is performed such that the third relationship is satisfied as the first priority and the first relationship is satisfied as the second priority.

17. The vehicle driving device of claim 1,
wherein in the electric power-prioritized control, the right and left motor generators are controlled such that the second relationship is satisfied as the second priority.

18. The vehicle driving device of claim 17,
wherein at the time of acceleration of the vehicle, the control is performed such that the third relationship is satisfied as the first priority and the second relationship is satisfied as the second priority.

19. The vehicle driving device of claim 1,
wherein a left speed changer is provided on a power transmission path between the left wheel and the left motor generator,
wherein a right speed changer is provided on a power transmission path between the right wheel and the right motor generator,
wherein each of the right and left speed changers is a planetary gear type speed changer including first to third rotation elements,
wherein the right and left motor generators are connected to the first rotation elements of the right and left speed changers, respectively,
wherein the right and left wheels are connected to the second rotation elements of the right and left speed changers, respectively,
wherein the third rotation elements of the right and left speed changers are connected to each other, and
wherein a connection/disconnection means and a one-way power transmission unit are provided in parallel with the third rotation elements,
wherein the connection/disconnection means is disengaged or engaged to bring a motor generator side that is composed of the right and left motor generators and a wheel side that is composed of the right and left wheels to a disconnected state or a connected state,
wherein the one-way power transmission unit becomes:
an engaged state when a forward rotational power is inputted to the wheel side from the motor generator side;
a disengaged state when an reverse rotational power is inputted to the wheel side from the motor generator side;
the disengaged state when a forward rotational power is inputted to the motor generator side from the wheel side; and
the engaged state when an reverse rotational power is inputted to the motor generator side from the wheel side.

20. The vehicle driving device of claim 19,
wherein when the sum of the left electric power and the right electric power in the third relationship becomes zero or more, the connection/disconnection means is engaged, where generation of electric power is defined as a positive value.

21. The vehicle driving device of claim 19,
wherein when the sum of the left electric power and the right electric power in the third relationship is lower than a given value of zero or less, the connection/disconnection means is disengaged, where generation of electric power is defined as a positive value.

22. The vehicle driving device of claim 19,
wherein the first, second and third rotation elements of the planetary gear type speed changers are sun gears, carriers, and ring gears, respectively.

* * * * *